US011670165B2

(12) United States Patent
Cross

(10) Patent No.: US 11,670,165 B2
(45) Date of Patent: *Jun. 6, 2023

(54) SYSTEMS AND METHODS FOR ROADWAY MANAGEMENT INCLUDING FEEDBACK

(71) Applicant: STC, Inc., McLeansboro, IL (US)

(72) Inventor: Brad Cross, McLeansboro, IL (US)

(73) Assignee: STC, Inc., McLeansboro, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/669,090

(22) Filed: Feb. 10, 2022

(65) Prior Publication Data

US 2022/0165154 A1 May 26, 2022

Related U.S. Application Data

(63) Continuation of application No. 17/139,641, filed on Dec. 31, 2020, now Pat. No. 11,295,612, which is a (Continued)

(51) Int. Cl.
*H04N 5/44* (2011.01)
*G08G 1/07* (2006.01)
(Continued)

(52) U.S. Cl.
CPC ............... *G08G 1/07* (2013.01); *G08G 1/005* (2013.01); *G08G 1/056* (2013.01); *G08G 1/087* (2013.01)

(58) Field of Classification Search
CPC .......... G08G 1/07; G08G 1/005; G08G 1/056; G08G 1/087; G08G 1/012
See application file for complete search history.

(56) References Cited

U.S. PATENT DOCUMENTS 4,321,589 A * 3/1982 King ...................... G08G 1/087 340/941
4,914,434 A 4/1990 Morgan et al.
(Continued)

FOREIGN PATENT DOCUMENTS

DE 19712253 A1 10/1998
DE 19748173 A1 5/1999
(Continued)

OTHER PUBLICATIONS

International Search Report, International Patent Application No. PCT/US2012/044474, dated Jan. 7, 2013 (9 pages).
(Continued)

*Primary Examiner* — Munear T Akki
(74) *Attorney, Agent, or Firm* — Lewis Rice LLC

(57) ABSTRACT

A system and method that enables individual travelers, including pedestrians or individuals on smaller conveyances, to communicate their location and direction of travel to signal light controllers at an intersection, enables traffic networks to receive this communication and output the detected data to the corresponding intersection traffic-signal controller to allow for individuals not in standard motor vehicles to be detected by traffic detection systems and to allow for priority of traveler flow either independent of vehicle use, or based on specifics of the vehicle used. The system also provides feedback to the traveler to provide information about the actions of the system or to alter the movement of the traveler.

14 Claims, 13 Drawing Sheets

Related U.S. Application Data continuation-in-part of application No. 16/871,475, filed on May 11, 2020, now Pat. No. 11,113,963, and a continuation of application No. 16/391,024, filed on Apr. 22, 2019, now Pat. No. 10,679,495, which is a continuation of application No. 15/921,443, filed on Mar. 14, 2018, now Pat. No. 10,311,725, which is a continuation-in-part of application No. 15/299,225, filed on Oct. 20, 2016, now Pat. No. 9,953,522.

(60) Provisional application No. 62/955,807, filed on Dec. 31, 2019, provisional application No. 62/244,090, filed on Oct. 20, 2015.

(51) Int. Cl.

*G08G 1/087* (2006.01)
*G08G 1/056* (2006.01)
*G08G 1/005* (2006.01)

(56) References Cited

U.S. PATENT DOCUMENTS

| | | | | |
|---|---|---|---|---|
| 5,539,398 | A | 7/1996 | Hall et al. | |
| 5,610,599 | A | 3/1997 | Nomura et al. | |
| 5,926,113 | A | 7/1999 | Jones et al. | |
| 5,929,787 | A * | 7/1999 | Mee | G08G 1/07 340/908 |
| 5,986,575 | A | 11/1999 | Jones et al. | |
| 6,064,319 | A * | 5/2000 | Matta | G08G 1/087 701/1 |
| 6,323,307 | B1 | 11/2001 | Bigg et al. | |
| 6,621,420 | B1 | 9/2003 | Poursartip | |
| 7,098,806 | B2 | 8/2006 | Bachelder | |
| 7,116,245 | B1 | 10/2006 | Bachelder | |
| 7,327,280 | B2 | 2/2008 | Bachelder et al. | |
| 7,663,505 | B2 | 2/2010 | Publicover | |
| 7,751,390 | B2 | 7/2010 | Mosko et al. | |
| 7,835,351 | B2 | 11/2010 | Mosko et al. | |
| 7,864,071 | B2 | 1/2011 | Bachelder et al. | |
| 7,868,783 | B2 | 1/2011 | Bachelder | |
| 3,054,202 | A1 | 11/2011 | Sikora et al. | |
| 8,274,404 | B2 | 9/2012 | Sennett et al. | |
| 8,825,350 | B1 | 9/2014 | Robinson | |
| 8,830,085 | B2 | 9/2014 | Edwardson et al. | |
| 8,878,695 | B2 | 11/2014 | Cross | |
| 8,972,159 | B2 | 3/2015 | Ferreira et al. | |
| 9,349,288 | B2 | 5/2016 | Raamot | |
| 9,558,666 | B2 | 1/2017 | Jansson et al. | |
| 9,916,759 | B2 | 3/2018 | Cross | |
| 9,934,685 | B1 | 4/2018 | Bernhardt et al. | |
| 9,953,522 | B2 | 4/2018 | Cross et al. | |
| 10,059,255 | B1 | 8/2018 | Schreiber et al. | |
| 2001/0037174 | A1* | 11/2001 | Dickerson | G08G 1/202 701/400 |
| 2002/0065599 | A1 | 5/2002 | Hameleers et al. | |
| 2002/0126022 | A1 | 9/2002 | Ellis | |
| 2006/0261977 | A1 | 11/2006 | Bachelder | |
| 2007/0069920 | A1 | 3/2007 | Hakki et al. | |
| 2009/0256721 | A1* | 10/2009 | Glatfelter | G08G 1/07 340/928 |
| 2010/0141479 | A1 | 6/2010 | Arnold et al. | |
| 2010/0309023 | A1* | 12/2010 | Busch | G08G 1/07 340/917 |
| 2010/0325720 | A1* | 12/2010 | Etchegoyen | H04L 63/1408 726/17 |
| 2011/0109478 | A1* | 5/2011 | Williamson | G08G 1/087 340/906 |
| 2011/0187559 | A1 | 8/2011 | Applebaum | |
| 2011/0205086 | A1 | 8/2011 | Lamprecht et al. | |
| 2012/0188099 | A1 | 7/2012 | Lee et al. | |
| 2012/0229303 | A1* | 9/2012 | Loffl | G08G 1/087 340/906 |
| 2012/0326890 | A1 | 12/2012 | Cross | |
| 2012/0326891 | A1 | 12/2012 | Cross | |
| 2013/0018572 | A1 | 1/2013 | Jang | |
| 2013/0048795 | A1 | 2/2013 | Cross | |
| 2013/0083722 | A1 | 4/2013 | Bhargava et al. | |
| 2013/0116915 | A1 | 5/2013 | Ferreira et al. | |
| 2013/0210460 | A1 | 8/2013 | Subramanian et al. | |
| 2014/0185880 | A1 | 7/2014 | Fairfield et al. | |
| 2014/0278029 | A1 | 9/2014 | Tonguz | |
| 2014/0278052 | A1 | 9/2014 | Slavin et al. | |
| 2014/0291454 | A1 | 10/2014 | Cross | |
| 2015/0213713 | A1 | 7/2015 | Taylor | |
| 2015/0243165 | A1 | 8/2015 | Elsheemy | |
| 2016/0163193 | A1 | 6/2016 | Cross | |
| 2016/0189552 | A1 | 6/2016 | Hilleary | |
| 2016/0267787 | A1 | 9/2016 | Whitney et al. | |
| 2016/0292996 | A1 | 10/2016 | Kim et al. | |
| 2016/0379490 | A1 | 12/2016 | Simanowski et al. | |
| 2017/0092126 | A1 | 3/2017 | Daisuke et al. | |
| 2017/0116849 | A1 | 4/2017 | Foreman et al. | |
| 2017/0132915 | A1 | 5/2017 | Cross et al. | |
| 2017/0148317 | A1* | 5/2017 | Diba | G08G 1/081 |
| 2017/0337819 | A1 | 11/2017 | Wei et al. | |
| 2018/0096595 | A1 | 4/2018 | Janzen et al. | |
| 2018/0204451 | A1* | 7/2018 | Cross | G08G 1/005 |
| 2018/0218226 | A1 | 8/2018 | Wellington et al. | |
| 2018/0286228 | A1 | 10/2018 | Xu et al. | |
| 2019/0225145 | A1 | 7/2019 | Sippl | |
| 2019/0384302 | A1 | 12/2019 | Silva et al. | |
| 2019/0385448 | A1 | 12/2019 | Montemurro et al. | |
| 2020/0233072 | A1 | 7/2020 | Osai et al. | |
| 2020/0312132 | A1 | 10/2020 | Cross et al. | |
| 2020/0342760 | A1* | 10/2020 | Vassilovski | G05D 1/0289 |
| 2020/0402397 | A1 | 12/2020 | Yamazaki et al. | |

FOREIGN PATENT DOCUMENTS

| | | | |
|---|---|---|---|
| DE | 19748174 | A1 | 5/1999 |
| EP | 1845503 | A2 | 10/2007 |
| GB | 2312215 | A | 10/1997 |
| JP | 2000011448 | A | 1/2000 |
| JP | 2003051215 | A | 2/2003 |
| JP | 2003516343 | W | 5/2003 |
| JP | 2004030082 | A | 1/2004 |
| JP | 2011186697 | A | 9/2011 |
| JP | 2012003602 | A | 1/2012 |
| JP | 2012155477 | A | 8/2012 |
| JP | 2014224715 | A | 12/2014 |
| JP | 2016110413 | A | 6/2016 |
| JP | 2018500661 | A | 1/2018 |
| KR | 1020060107262 | A | 10/2006 |
| KR | 1020180067471 | A | 6/2018 |

OTHER PUBLICATIONS

International Search Report, International Patent Application No. PCT/US2016/057954, dated Feb. 14, 2017 (9 pages).

International Search Report, International Patent Application No. PCT/US2019/022302, dated Jul. 2, 2019 (10 pages).

International Search Report, International Patent Application No. PCT/US2020/067712, dated Apr. 27, 2021 (3 pages).

International Search Report and Written Opinion, International Patent Application No. PCT/US2020/021160, dated Jul. 2, 2020 (10 pages).

International Search Report and Written Opinion, International Patent Application No. PCT/US2019/066472, dated Apr. 17, 2020 (12 pages).

Applied Information, Inc. Webpage for Digital Media Kit, http://appinfoinc.com/newsroom/digital-media-kit/, printed on Jun. 22, 2018 (7 pages).

TravelSafely Infographic, "How TravelSafely Works," by Applied Information, http://appinfoinc.com/wp-content/uploads/2017/09/TravelSafely-Infographic.pdf, printed on Jun. 22, 2018 (1 page).

TravelSafely Brochure, "Connected Vehicle & Smart City Solutions, The future of connected vehicles is in your hands," Powered by Applied Information, http://appinfoinc.com/wp-content/uploads/2017/12/ts-brochure-1217.pdf, printed on Jun. 22, 2018 (3 pages).

(56) References Cited

OTHER PUBLICATIONS

Tonguz, Ozan K. "Red Light, Green Light-No Light." Spectrum IEEE. Oct. 2018: 24-29. (7 pages).
Written Opinion, International Patent Application No. PCT/US2019/055410, dated Jul. 2, 2019 (7 pages).

* cited by examiner

SYSTEMS AND METHODS FOR ROADWAY MANAGEMENT INCLUDING FEEDBACK

CROSS REFERENCE TO RELATED APPLICATION(S)

The Applications is a Continuation of U.S. Utility patent application Ser. No. 17/139,641 filed Dec. 31, 2020 which claims the benefit of U.S. Provisional Application No. 62/955,807, filed Dec. 31, 2019. This Applications is also a Continuation-In-Part (CIP) of U.S. Utility patent application Ser. No. 16/871,475, filed May 11, 2020, which is a Continuation of U.S. Utility patent application Ser. No. 16/391,024, filed Apr. 22, 2019, which is a Continuation of U.S. Utility patent application Ser. No. 15/921,443, filed Mar. 14, 2018, and now U.S. Pat. No. 10,311,725, which is a Continuation-In-Part (CIP) of U.S. Utility patent application Ser. No. 15/299,225, filed Oct. 20, 2016 and now U.S. Pat. No. 9,953,522, which claims the benefit of U.S. Provisional Patent Application Ser. No. 62/244,090, filed Oct. 20, 2015. The entire disclosure of all the above documents is incorporated herein by reference.

BACKGROUND

1. Field of the Invention

This disclosure is related to the field of systems and methods for the management of traffic flow through the controlling of signal lights and detection of and communication with travelers within a traffic grid. Specifically, the system relates to providing personal detection systems to individuals to allow the individuals to interact with controlled signal lights and to allow the controlled signal lights to interact with individuals and their vehicles.

2. Description of the Related Art

In the perfect urban commuter's utopia, signal lights would automatically switch to green every time a driver or pedestrian approached an intersection, creating an unobstructed pathway towards the individual's final destination regardless of the type of vehicle—or lack of vehicle. However, in real life, encountering a red light at an intersection or a "DON'T WALK" signal at a crosswalk is a normal and inevitable part of urban travel. With the growth of modern cities and the increasing number of bicycle and pedestrian lanes, mass transit vehicles that utilize roadways, carpool lanes, sidewalks, and other forms of transportation that are different from the single occupant automobile, efficient control of the ebb and flow of all traffic through efficient and smart signal-light control and coordination systems has become increasingly important.

There are many substantial benefits to be reaped from improved traffic flow through a traffic grid for all types of vehicles. For many commuters, reclaiming part of their day from being stuck in traffic would enhance their quality of life. Further, less congestion on the roads may generate fewer accidents, thereby saving lives. Moreover, traffic delays impinge on productivity and economic efficiency—time spent traveling to and from work is not time spent doing work. Further, many goods must be transported in vehicles and many service providers must travel to their clients to meet with them. Traffic delays all of these economic production factors.

There is also a concern regarding the increased pollution that results from motor vehicles in stop-and-go traffic compared to smooth flowing traffic. Generally, longer commutes mean longer running times and also entail more greenhouse gas release. Further, congested traffic and uncoordinated signal lights can cause delays in a mass transit system that, if not remedied, can throw off an entire mass transit schedule across a traffic grid and disincentivise individuals from using mass transit systems. Moreover, increased wait times and traffic may cause pedestrians, bicyclists, or other non-automobile travelers to take unnecessary risks when travelling in order to reduce wait and or travel times. Lastly, the importance of prioritizing and efficiently moving emergency vehicles through traffic lights is axiomatic.

In an attempt to improve traffic flow, there have been a wide variety of different systems developed and implemented. In some cases, these systems are based on road design. For example, some communities utilize switching lanes where traffic is in one direction during a morning and the opposing direction during an evening to provide a larger roadway in the direction most traffic is expected. Some similar arrangements are the use of specialty lanes (e.g., "Diamond" lanes), which lanes are limited to certain types of vehicles intended to produce less pollution or are carrying an increased passenger load (which may also be known as "high occupancy vehicle" lanes). A problem with these systems, however, is that they are designed for large throughway type systems and do not work for local roads, which are common on both ends of the typical commute.

Within road systems (or traffic grids) such as city grids, there are currently a variety of different control and coordination systems utilized to ensure the smooth and safe management of traffic flows. The primary issue on local roads, as opposed to large interstates, is the regulation of intersecting traffic lanes and the near ubiquitous stoplight, also known as a signal light. While traffic flow through intersections can be improved through the use of roundabouts (or rotaries), these systems are often poorly understood by local drivers (particularly in the United States) and can actually create more problems than they solve. The intersection, instead, creates a near essential requirement to impede the flow of some traffic to facilitate the flow of other traffic. In effect, the interaction of traffic at an intersection requires an assignment of who gets to go through the intersection first. In a default, it is simply whoever has the green light at their time of arrival. However, this process is often inefficient. People will run or accelerate through changing traffic lights to avoid delays and will sometimes even disregard the traffic light if they become upset at being stopped in what they consider an "unfair" situation.

To deal with the problems created by traffic lights, one commonly utilized mechanism is the traffic controller system. In a typical traffic controller system, the timing of a particular signal light is controlled by a traffic controller located inside a cabinet that is at a close proximity to the signal light. Generally, the traffic controller cabinet contains a power panel (to distribute electrical power in the cabinet); a detector interface panel (to connect to loop detectors and other detectors for sensing vehicles); detector amplifiers; a controller; a conflict motor unit; flash transfer relays; and a police panel (to allow the police to disable and control the signal), amongst other components.

Traffic controller cabinets generally operate on the concept of phases or directions of movement grouped together to provide for efficient movement through a traffic light. For example, a simple four-way intersection will have two phases: North/South and East/West; a four-way intersection with independent control for each direction and each left hand turn will have eight phases. Controllers also generally operate on the concept of rings or different arrays of independent timing sequences. For example, in a dual ring controller, opposing left-turn arrows may turn red independently, depending on the amount of traffic. Thus, a typical controller is an eight-phase, dual ring controller.

The purpose of the traffic controller cabinet is to ensure that traffic is not waiting at the intersection for a long period of time when there is no opposing traffic in the other direction, and to make sure that traffic can move through the intersection in an orderly fashion. Backups and "gridlock" usually occur because the traffic lights do not effectively move traffic through related intersections and because lights are green for too short a period of time in a particular direction. For example, if a first light turns green, but the light in the next block is still red, traffic can back up through the first intersection waiting for the second light to change. If the first light turns back to red before the second turns green, cross traffic on the first intersection is blocked by the cars sitting in the intersection waiting. Yet vehicles will go into the intersection at every change of the light because otherwise cars in the first direction cannot go through the light at all. Other types of backups and negative interactions are also possible.

To address these problems, the traffic controller cabinet will generally utilize some form of control over both individual lights and light networks, with the goal of improving traffic flow and preventing these types of problems. The currently utilized control and coordination systems for the typical signal light range from simple clocked timing mechanisms to sophisticated, computerized control and coordination systems that self-adjust to minimize the delay to individuals utilizing the roadways. In all cases, the goal is essentially the same: move as many vehicles through the intersection in as little time as possible.

The simplest control system currently utilized is a timer system. In such a system, each phase of a traffic light lasts for a specific duration until the next phase change occurs. Generally, this specific timed pattern will repeat itself regardless of the current traffic flows or the location of a priority vehicle within the traffic grid. While this type of control mechanism can be effective in one-way grids where it is often possible to coordinate signal lights to a desired travel speed, this control mechanism is generally not advantageous when the signal timing of the intersection would benefit from being adapted to the changing flows of traffic throughout the day. As a result, a timer system is generally no longer used in new traffic signal installations. Timing control mechanisms can also work for lights in sequence (e.g., successive blocks) but generally only work in one direction. Thus, even timing control will generally benefit from at least rudimentary modifications for traffic conditions at different times of day.

Dynamic signals, also known as actuated signals, are programmed to adjust their timing and phasing to meet the changing ebb and flow in traffic patterns throughout the day. Generally, dynamic traffic control systems use input from vehicle detectors to adjust signal timing and phasing. Detectors are devices that use sensors to inform the controller processor whether vehicles or other road users are present and waiting at the intersection. The signal control mechanism at a given light can utilize the input it receives from the detectors to adjust the length and timing of the phases, or if the phases even occur, in accordance with the current traffic volumes and flows.

For example, should a car be waiting to go straight through an intersection, but no car be waiting to make a left turn from the same direction, the light may turn green for straight traffic, and back to red, without ever triggering a left turn arrow, as none is needed. However, had a vehicle been detected in a turn lane as well, the light may have simultaneously turned green for straight and turning traffic, and the directly opposing direction may never have turned green as no one was waiting. Currently utilized detectors can generally be placed into three main classes: in-pavement detectors, non-intrusive detectors, and demand buttons for pedestrians.

In-pavement detectors are detectors that are located in or underneath the roadway. These detectors typically function similarly to metal detectors or weight detectors, utilizing the metal content or the weight of a vehicle as a trigger to detect the presence of traffic waiting at the light and, thus, can reduce the time period that a green signal is given to an empty road and increase the time period that a green signal is given to a busy throughway during rush hour. Non-intrusive detectors include video image processors, sensors that use electromagnetic waves, or acoustic sensors, each of which may detect the presence of vehicles at the intersection waiting for the right of way from a location generally over the roadway. These non-intrusive detectors generally perform the same function as in-pavement detectors, but do not need to be installed in the pavement. Some models of these non-intrusive detectors have the benefit of being able to sense the presence of vehicles or traffic in a general area or virtual detection zone preceding the intersection as opposed to just those waiting. Vehicle detection in these zones can have an impact on the timing of the phases, as they can often detect vehicles before the vehicles interact with the intersection based on their approach.

Some problems with the above systems, however, are that the systems are configured to detect motorized vehicles in standard motor vehicle lanes and cannot differentiate between different types of vehicles. In-ground detectors generally rely on a vehicle in a lane having enough metal (or mass) to trigger a magnetic (or weight) sensor, and video systems generally rely on sufficient volume of an object to be detected as a motor vehicle. To deal with pedestrians or light vehicles, such as bicycles, traffic systems are commonly supplied with a demand button on the sidewalk to request an intersection signal light change and a crosswalk signal. However, bicyclists, particularly high performance bicycles, and other light vehicles such as mopeds or motorcycles, as well as highly modern car body designs, may not include enough metal to trigger in-road systems and are commonly not allowed to travel on the sidewalk. Further, demand buttons still require the pedestrian to be waiting at, not approaching the intersection so no benefit of detection zones can be obtained. Finally, the systems typically cannot determine if a vehicle has multiple passengers, is a large mass transit vehicle, is a work vehicle, or is a personal car, as they are commonly detected and treated the same way.

Moreover, demand buttons and crosswalk indicators typically require additional, often expensive equipment at each intersection. Adding further cost is that these demand buttons and crosswalk indicators generally must be maintained periodically. Further, such equipment is also generally immovable and relatively static in its construction. This means that it may be difficult to update the static equipment when improvements to the system are devised. Further, to the extent that the need for a demand button and/or crosswalk indicator is only temporary, such equipment is difficult or impossible to remove conveniently. Such equipment often cannot be repurposed for another location easily.

Further, because demand buttons are generally placed near to a given intersection, a pedestrian must reach the location of a given demand button before informing the traffic light control system that the pedestrian would like to cross the road. Similarly, because crosswalk indicators typically use visual or audible indicators to inform pedestrians when it is safe to walk, such visual or audible indicators typically have a limited effective range. Accordingly, pedestrians outside of that effective range cannot benefit from any indications. Finally, persons with special needs, who may not be able to see or hear the crosswalk indicators, may not be able to benefit in any way from the crosswalk indicators. Said another way, because the crosswalk indicators are physical systems that are not easily modified or updated, the crosswalk indicators may not be capable of providing indications to persons who require a different type of notification.

In sum, current systems are designed to detect motor vehicles and are centered on the presence of at least one vehicle as the calculator in determining priority. Most systems utilize the presence of one or more vehicles waiting at the intersection (or approaching it) as the "trigger" to indicate that a green light is necessary in that direction. This individual motor vehicle approach provides for some problems of its own in efficiency. In the first instance, these systems generally provide that the approach of a single vehicle that is not traveling in the current flow requires a priority assignment to interrupt current flow at a later time. This is often based on the time to clear the intersection, but does not take into account the relative importance of a particular flow. For example, if a lone car approached a currently very busy cross street, it will generally be the case that it will take a window of time before the cross street traffic can be interrupted. For example, it may take 15 seconds to provide warning before switching crosswalk indicators from a "WALK" signal to a "DON'T WALK" signal for pedestrians that could otherwise be walking in front of the newly arrived vehicle. Once the interruption occurs, the newly arrived vehicle will be allowed to enter the intersection, but the main flow will often be quickly reestablished to avoid further interruption.

The above can actually be extremely inefficient. A few simple examples are the need to spend 15 seconds switching the crosswalk indicators. If there are no pedestrians in the crosswalk or approaching, the crosswalk indicators could simply change immediately to "DON'T WALK" without warning, allowing the interruption to occur much quicker, meaning the newly arrived driver does not have to wait as long. Secondly, if a second car was to pull up in the same direction as the one now being allowed to go through, the second car may not make the short signal, resulting in the second car having to wait and the need for a second, later interruption. In effect, the problem with basing the change on the "presence" of an individual vehicle is that the system utilizes a traffic interruption pattern that is less than efficient for the actual flow of traffic through the intersection than one which can actually monitor traffic with greater accuracy.

A second problem with current systems is that an individual vehicle detector that is motor-vehicle-centered cannot accurately cater the needs of those that need to utilize the intersection but are not using a typical motor vehicle. A first example is the need to provide warning of the changing signal to an empty crosswalk with no pedestrians. A second is a problem with not detecting smaller vehicles, particularly non-motorized vehicles and pedestrians, that need the signal to change.

Bicyclists, in particular, can have problems with intersection detection systems because they are often in a specialized bike lane that actually lacks an in-ground detector, coverage from a video detector and, because they are not on a sidewalk like a pedestrian, do not have ready access to the demand buttons available for pedestrians. It is, thus, very possible for a bicyclist to be forced to sit at an intersection until a car comes along going the direction they wish to go, so that the detection system controlling the intersection can be activated. This regularly forces a bicyclist to either stay with a flow of motor vehicles that can trigger the intersection detection systems for it, or to hope that a motor vehicle is available at the intersection at the right time. The remaining alternative is for them to simply disobey the traffic signal and rely on their own personal determination of safety. This can make bicycle riding on less congested streets (which is often preferred from a safety point of view) a frustrating experience because the bicyclist is constantly being forced to stop at intersections (making the ride more difficult) and wait when there is no need for the stoppage. All of this may lead to bicyclists disregarding traffic signals, which may, in turn, make the safer route more dangerous for the bicyclists.

This lack of control of intersection lights not only creates frustration but can create dangerous situations. Bicyclists who are aware that they cannot change an intersection to match their needs may attempt to simply run the intersection on a yellow or red light, or go faster than they should to keep up with a motor vehicle that will change the light. Alternatively, bicyclists may ride on a sidewalk so they can trigger demand buttons or may choose to ride on more congested roads where motor vehicle traffic is more likely to trigger intersections for them in a beneficial way.

Above and beyond detectors for individual signal lights, coordinated systems that string together and control the timing of multiple signal lights are advantageous in the control of traffic flow within traffic grids, for example, within more urban areas. Generally, coordinated systems are controlled from a master controller and are set up so that signal lights cascade in sequence, thereby allowing a group or "platoon" of vehicles to proceed through a continuous series of green lights. Accordingly, these coordinated systems make it possible for drivers to travel long distances without encountering a red light, dramatically improving traffic flow. Such coordination may also encourage adherence to posted speed limits at least because such adherence results in less stoppage. Generally, on one-way streets, this coordination can be accomplished with fairly constant levels of traffic. Two-way streets are much more complicated but often end up being arranged to correspond with rush hours to allow longer green light times for the heavier volume direction or to have longer greens on larger roads with shorter sections on cross streets.

The most technologically advanced coordinated systems control a series of traffic grid signal lights through a centrally controlled system that allows for the signal lights to be coordinated in real-time through sensors that can sense the levels of traffic approaching and leaving a virtual detection zone that precedes a particular intersection. Often these types of systems get away from algorithmic control of traffic patterns (e.g., where platoons are created based on expected traffic flow regardless of whether vehicles are actually present) to priority systems where the priority of any particular motor vehicle at any intersection at any instant can be determined to improve traffic flow. Priority systems allow for very high priority vehicles, such as emergency vehicles, to have unimpeded access even in heavy traffic conditions, and in the best of these systems, traffic flow through the entire traffic grid is changing all the time based on the location of vehicles in the system and determinations of how best to maximize the movement of the most number (or the most desirable type) of vehicles.

While cascading or synchronized central control systems with priority are an improvement on the traditional timer controlled systems, they still have their drawbacks. Namely, very high priority vehicles (e.g., emergency vehicles) in these systems are often only able to interact with a detection zone immediately preceding a particular intersection; there is no real-time monitoring of the traffic flows preceding or following this detection zone across a grid of multiple signal lights. Stated differently, there is no real-time monitoring of how a single vehicle or a group of vehicles travels through a traffic grid as a whole (i.e., approaching, traveling through and leaving intersections along with a vehicle's transit between intersections). Accordingly, these systems can provide for a priority vehicle, such as an emergency vehicle, to be accelerated through a particular signal at the expense of other vehicles, but they can lack the capability to adapt and adjust traffic flows to respond to the fact that the emergency vehicle has disrupted the traffic flow by its passage and now the remaining traffic flow needs to be modified to accommodate that passage.

If a priority vehicle is sensed in the detection zone, the immediately upcoming light will generally change to green to give the priority vehicle the right-of-way and potentially disrupt the entire system. While this is generally logical for allowing rapid passage of an emergency vehicle where disruption is an acceptable inconvenience for insuring timely emergency services, another issue of disruption not taken into account is pedestrian, bicycle, and other light vehicle traffic. Pedestrian demand buttons need to have an effect on traffic flow to allow for pedestrian movement, but if they actually provide on-demand services, they become effectively the equivalent of a high priority vehicle and can disrupt a coordinated traffic flow. This problem, as well as other related problems, may be exacerbated by the inability of the system to communicate directly and/or effectively with pedestrians and light vehicle traffic.

There are many substantial benefits to be reaped from improved non-motorized traffic flow for individual commuters in urban areas. These benefits are clearest as a part of a traffic grid with coordinated signals, that is, successive intersections that adjust signal timing to grant more green-light time for directions with heavy traffic. A traffic grid with coordinated signals, granting the same consideration to motorized as well as smaller vehicles, bicycles, and/or pedestrians, offers commuters multiple options for their selected mode of travel, typically reducing motorized traffic and resulting in less congestion. Congested traffic, uncoordinated signals, and/or unreliable coordination of signals may increase travel times and disincentivise individuals from smaller, more energy-efficient modes of travel. These other travel modes contribute lower amounts of greenhouse gas pollution. Additionally, travelers that encounter fewer red lights also have fewer opportunities to cross intersections against a red signal, reducing the likelihood of accidents.

Further, there are significant benefits to improving the ability for pedestrians, bicyclists, and/or other small vehicle operators (as well as autonomous motor vehicles) to communicate with traffic control systems. A traffic control system that is capable of communicating with these non-motorized (and/or autonomous) portions of the traffic grid may more effectively incorporate their needs, and in turn, run the traffic grid more efficiently. Further, increased communication may be able to minimize dangerous scenarios, leading to improved safety and less accidents. Finally, by tying the communications to a mobile device carried by the non-motorized (and/or autonomous) transportation operator or pedestrian, the system may be implemented without the need for high-cost and static pedestrian communications infrastructure, such as crosswalk indicators.

Accordingly, there is a need in the art for a system that may be utilized by both travelers and traffic grid operators, that has the ability to communicate with pedestrians, bicyclists, and other small vehicle operators. Existing signal controllers may be programmed to manage communications to and from the traffic control system and may alter the timing phases for the intersection to grant passage to pedestrian and small vehicle operators according to the traffic standards for the given area to provide priority to different types of vehicles at different times.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein are systems and methods that enable individual travelers, including pedestrians or individuals on smaller conveyances, to communicate their location and direction of travel to signal light controllers at an intersection, enables traffic networks to receive this communication and output the detected data to the corresponding intersection traffic-signal controller to allow for individuals not in standard motor vehicles to be detected by traffic detection systems and to allow for priority of traveler flow either independent of vehicle use, or based on specifics of the vehicle used. The system also provides feedback to the traveler to provide information about the actions of the system or to alter the movement of the traveler.

There is described herein, among other things, a method for assisting multiple travelers through an intersection, the method comprising; providing a plurality of travelers; associating a mobile communication device to each traveler in said plurality of travelers, each said mobile communication device communicating with a control system that said mobile communication device represents said associated traveler; providing a receiver for receiving a location and direction of travel transmission for each said mobile communication device; evaluating said location and direction of travel information to determine which mobile communication devices in said plurality of mobile communication devices are approaching an intersection; for each of said mobile communication devices approaching said intersection, determining how said traveler associated with said mobile communication device will pass through said intersection based on information received from said mobile device; and adjusting signaling at said intersection to allow more of said travelers to pass through said intersection without stopping than are stopped by said signaling at said intersection.

In an embodiment of the method, the mobile communication device comprises a smartphone.

In an embodiment of the method, the traveler comprises a pedestrian.

In an embodiment of the method, the traveler comprises an individual in a motor vehicle.

In an embodiment of the method, the motor vehicle includes multiple travelers in said plurality of travelers.

In an embodiment of the method, the traveler comprises an individual on a bicycle.

In an embodiment of the method, the traveler comprises an autonomous vehicle.

In an embodiment of the method, the determining comprises requesting information from said associated traveler.

In an embodiment of the method, the determining comprises obtaining a route from mapping software on said mobile communication device.

In an embodiment of the method, the determining comprises evaluating said location and direction of travel information.

In an embodiment, the method further comprising sending an indication to said mobile communication device of said adjusted signaling at said intersection.

In an embodiment of the method, the indication instructs said associated traveler to maintain speed approaching said intersection.

In an embodiment of the method, the indication instructs said associated traveler to stop at said intersection.

In an embodiment, the method further comprising sending an instruction to a vehicle associated with said traveler which instruction alters said vehicle's speed.

In an embodiment of the method, the instruction stops said vehicle.

DESCRIPTION OF THE PREFERRED EMBODIMENT(S)

Figure 1:
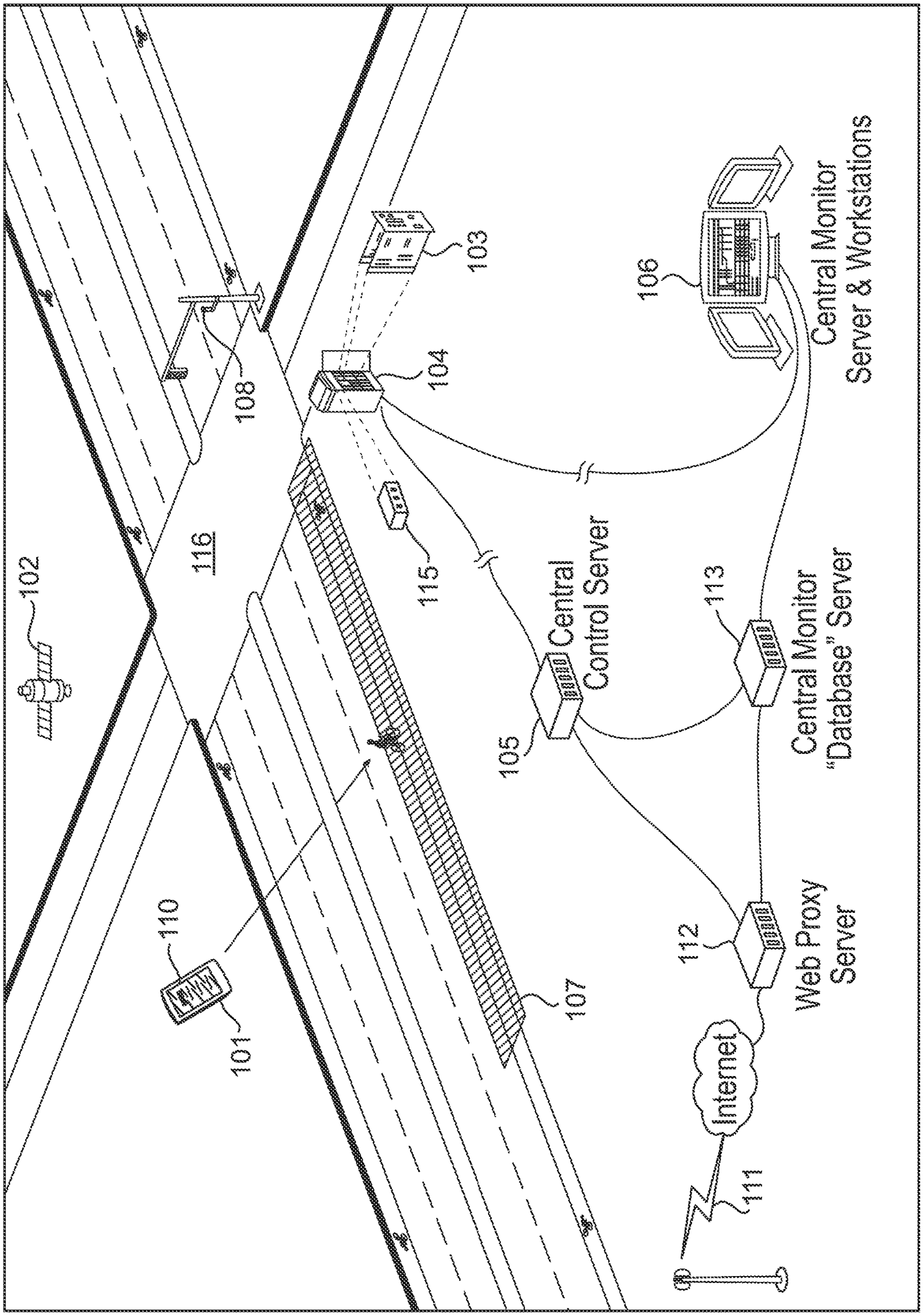
FIG. 1 provides a perspective view of a diagram of an embodiment of a system detecting a small vehicle carrying a mobile communication device and approaching an intersection while riding within a bicycle lane.

As a preliminary matter, it should be noted that while the description of various embodiments of the disclosed system will primarily discuss the movement of smaller non-motorized vehicles on a roadway (such as, but not limited to, bicycles), this is not intended to be limiting. A large variety of motorized smaller vehicles, non-motorized vehicles regardless of size, autonomous vehicles, and pedestrians need to go through signal lights. Further, these travelers may be on the roadway, in protected lanes, or on a sidewalk and still need to be detected. Still further, an individual in a standard motorized vehicle may need to have priority for a certain reason (e.g., a doctor trying to get to an emergency room) or may be provided with priority as a benefit (e.g., because they have paid a fee). Finally, certain types of mass transit vehicles may need to have priority to stay on schedule, to allow for express services between stops to be effectively provided, and to encourage use of mass transit.

Thus, the systems and methods discussed herein are designed to work for any individual by (a) detecting the presence of the individual at the intersection as opposed to a motor vehicle and/or (b) communicating with that individual. This includes them being a pedestrian, a driver, and/or passenger in any type of vehicle, particularly those not easily detected by traditional methods, that could benefit from the detection system described herein. This disclosure therefore provides a system that focuses on the individual "traveler" (where a traveler is effectively an individual person or a unit based on a person, for example, a self-driving vehicle with no human on-board) as opposed to an individual vehicle as the determiner for how to select priority for any traveler in the system. For example, it is contemplated that the system could be applied to and utilized by people aboard motorcycles, scooters, personal mobility devices, golf cars or golf carts, smart vehicles, or other vehicles not easily or reliably detected by traditional detection methods used to detect motor vehicles. It could also be used by those in more traditional motor vehicles (including autonomous vehicles) such as cars and trucks where the system may detect a passenger instead of or in addition to the vehicle itself. The system may also be used to detect pedestrians, such as those who may be walking, running, skateboarding, roller blading, or otherwise utilizing a street or sidewalk for travel, recognizing that these individuals may be moving at very disparate speeds from each other. In this disclosure, all the above individuals will be referred to as "travelers". The key trait of a traveler is simply that a traveler is an individual going between two locations having at least one intersection between them that the traveler needs to interact with along the way.

In much of this disclosure, the traveler will be discussed as utilizing a bicycle for transportation at least because this provides a representative example of how the system may operate using a well understood form of conveyance. Bicycles also generally operate on the street (as opposed to the sidewalk) and operate at speeds disparate from most motor vehicles. As should be apparent, as the traffic control system is generally designed to detect the individual traveler, as opposed to the vehicle, so long as an individual is present, the system may detect them. Further, the system may generally disregard what type of vehicle the travelers are operating (if any). Instead, the system may be simply interested that the traveler is approaching the intersection, in a particular lane and at a particular speed. The system then may allow for the traveler to interact with the intersection in a manner similar to all other travelers interacting with the same intersection that have the same priority as they do. Even further, the system may allow the traveler and the system to communicate back and forth to, for example, inform the traveler about the status of the intersection and the timing of any signal light changes.

Generally, the system for the detection of and communication with individuals at roadway intersections described herein is contemplated for use in an applicable traffic control system known to those of ordinary skill in the art and, in certain embodiments, is integrated into existing systems known to those of ordinary skill in the art that monitor and control the operation of traffic signals. In an embodiment, the systems and methods discussed herein are used in conjunction with various vehicle priority systems where certain vehicles may be given priority over others at a particular time as opposed to systems that utilize timing algorithms to determine traffic flow.

Throughout this disclosure, the term "computer" describes hardware that generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including, but not limited to eyewear, wrist wear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, may refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices that are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

For purposes of this disclosure, there will also be significant discussion of a special type of computer referred to as a "mobile communication device". A mobile communication device may be, but is not limited to, a smart phone, tablet PC, e-reader, satellite navigation system ("SatNav"), fitness device (e.g., a Fitbit™ or Jawbone™) or any other type of mobile computer whether of general or specific purpose functionality. Generally speaking, a mobile communication device is network-enabled and communicating with a server system providing services over a telecommunication or other infrastructure network. A mobile communication device is essentially a mobile computer, but one which is commonly not associated with any particular location, is also commonly carried on a traveler's person, and usually is in constant communication with a network.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software may be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "network" generally refers to a voice, data, or other telecommunications or similar network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network. Servers and clients may also exist virtually in so-called "cloud" arrangements.

Throughout this disclosure, the term "real-time" generally refers to software performance and/or response time within operational deadlines that are effectively generally cotemporaneous with a reference event in the ordinary user perception of the passage of time for a particular operational context. Those of ordinary skill in the art understand that "real-time" does not necessarily mean a system performs or responds immediately or instantaneously. For example, those having ordinary skill in the art understand that, where the operational context is a graphical user interface, "real-time" normally implies a response time of about one second of actual time for at least some manner of response from the system, with milliseconds or microseconds being preferable. However, those having ordinary skill in the art also understand that, under other operational contexts, a system operating in "real-time" may exhibit delays longer than one second, such as where network operations are involved which may include multiple devices and/or additional processing on a particular device or between devices, or multiple point-to-point round-trips for data exchange among devices. Those of ordinary skill in the art will further understand the distinction between "real-time" performance by a computer system as compared to "real-time" performance by a human or plurality of humans. Performance of certain methods or functions in real-time may be impossible for a human, but possible for a computer. Even where a human or plurality of humans could eventually produce the same or similar output as a computerized system, the amount of time required would render the output worthless or irrelevant because the time required is longer than how long a consumer of the output would wait for the output, or because the number and/or complexity of the calculations, the commercial value of the output would be exceeded by the cost of producing it.

Figure 2:
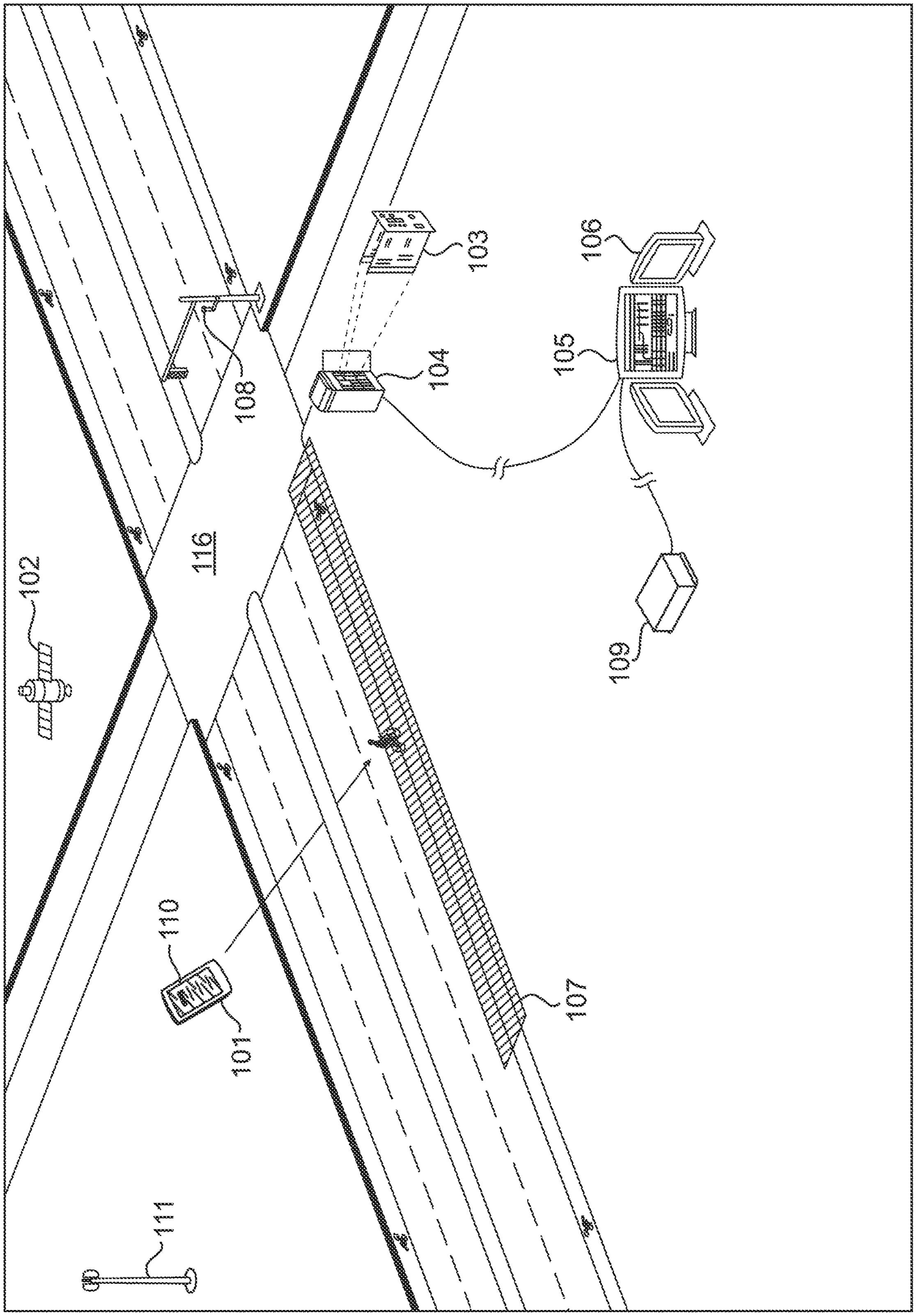
FIG. 2 provides a perspective view of a diagram of an embodiment of a detection process using a communications server to run qualification algorithms to determine if the mobile communication device is in a detection zone and meets other pre-defined parameters.
Figure 3:
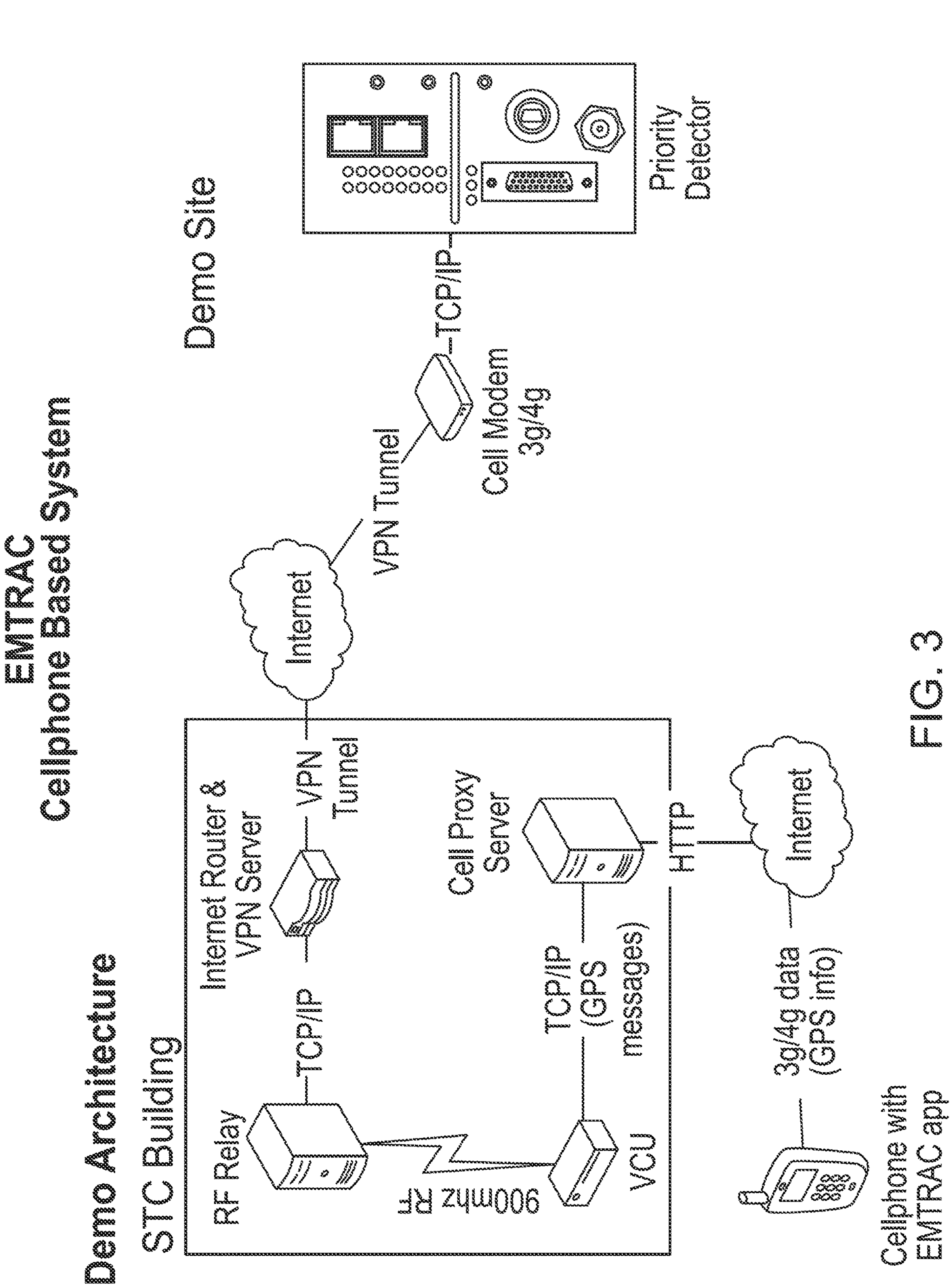
FIGS. 3, 4, 5, 6, 7, 8, 9, 10, 11, and 12, provide general block diagrams of different embodiments of systems for detecting a mobile communication device.
Figure 4:
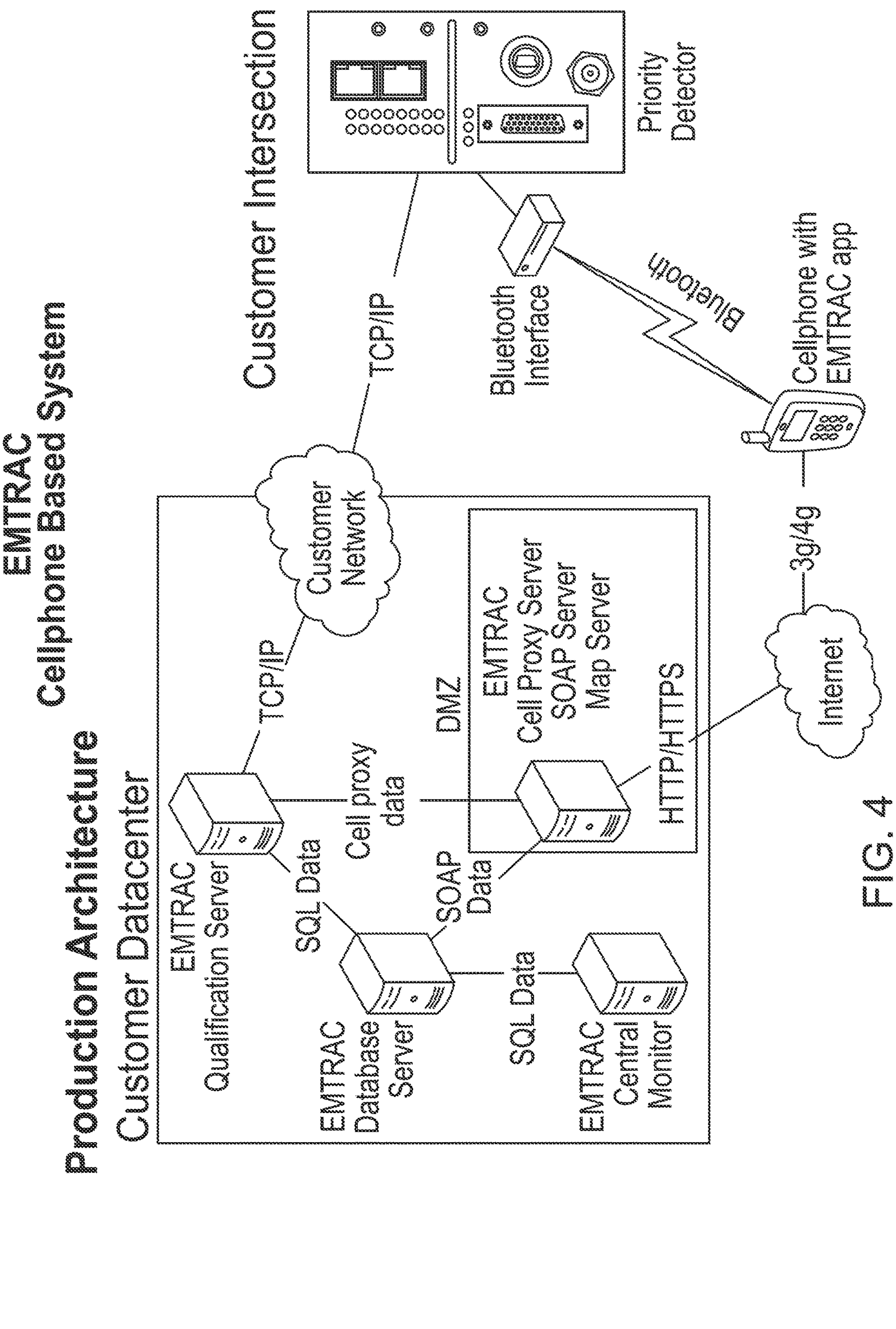
Figure 5:
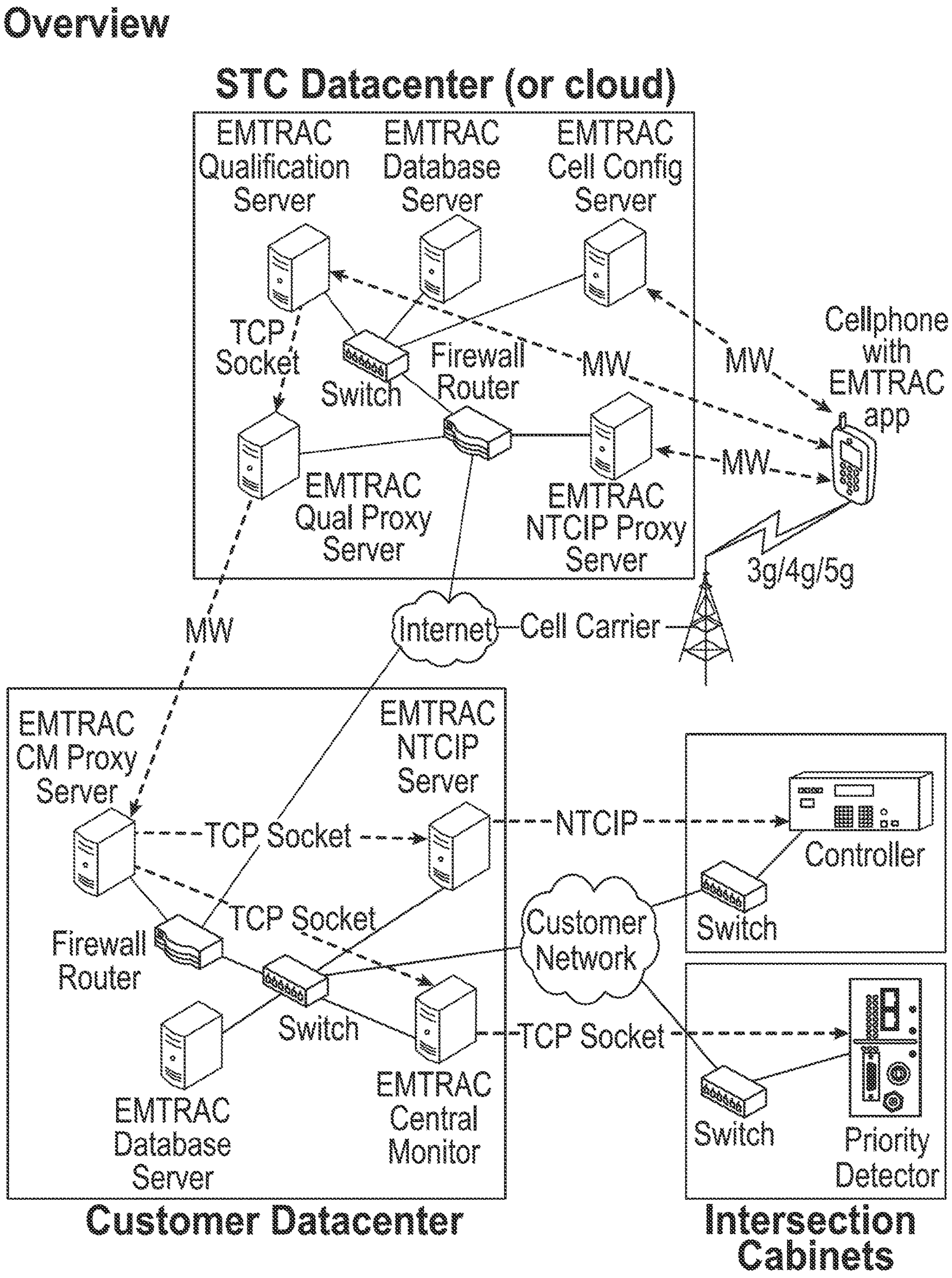
Figure 6:
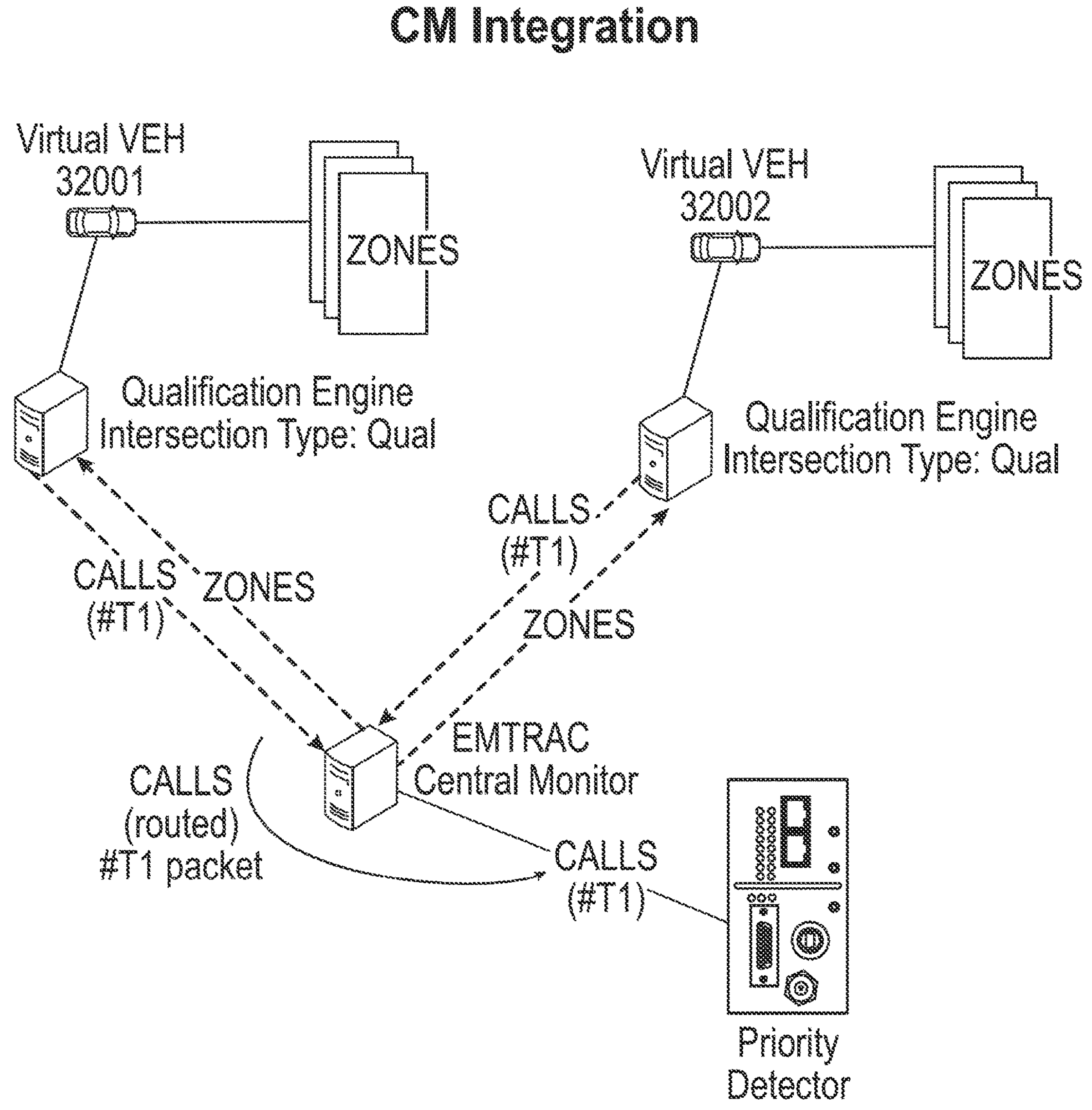
Figure 7:
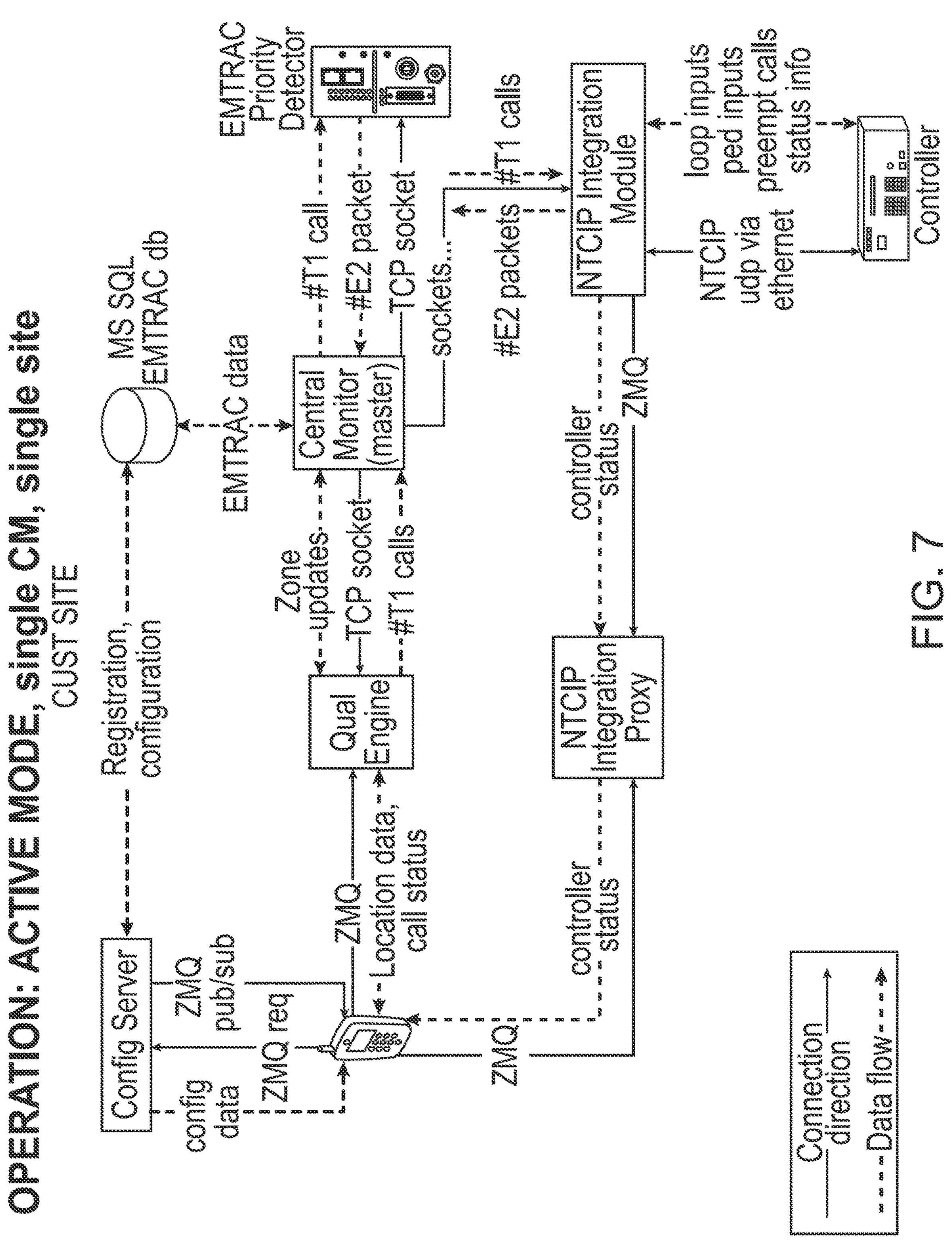
Figure 8:
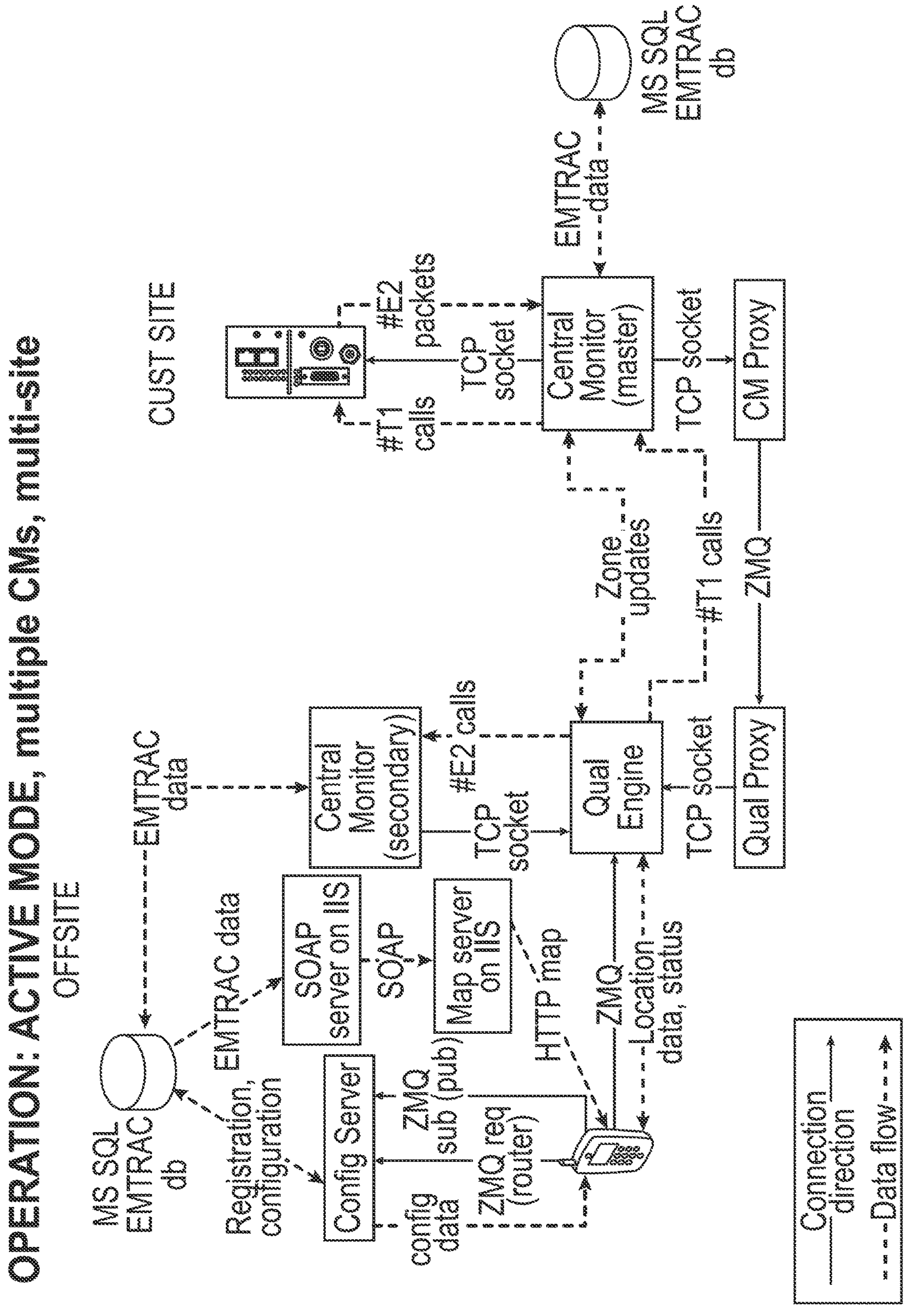
Figure 9:
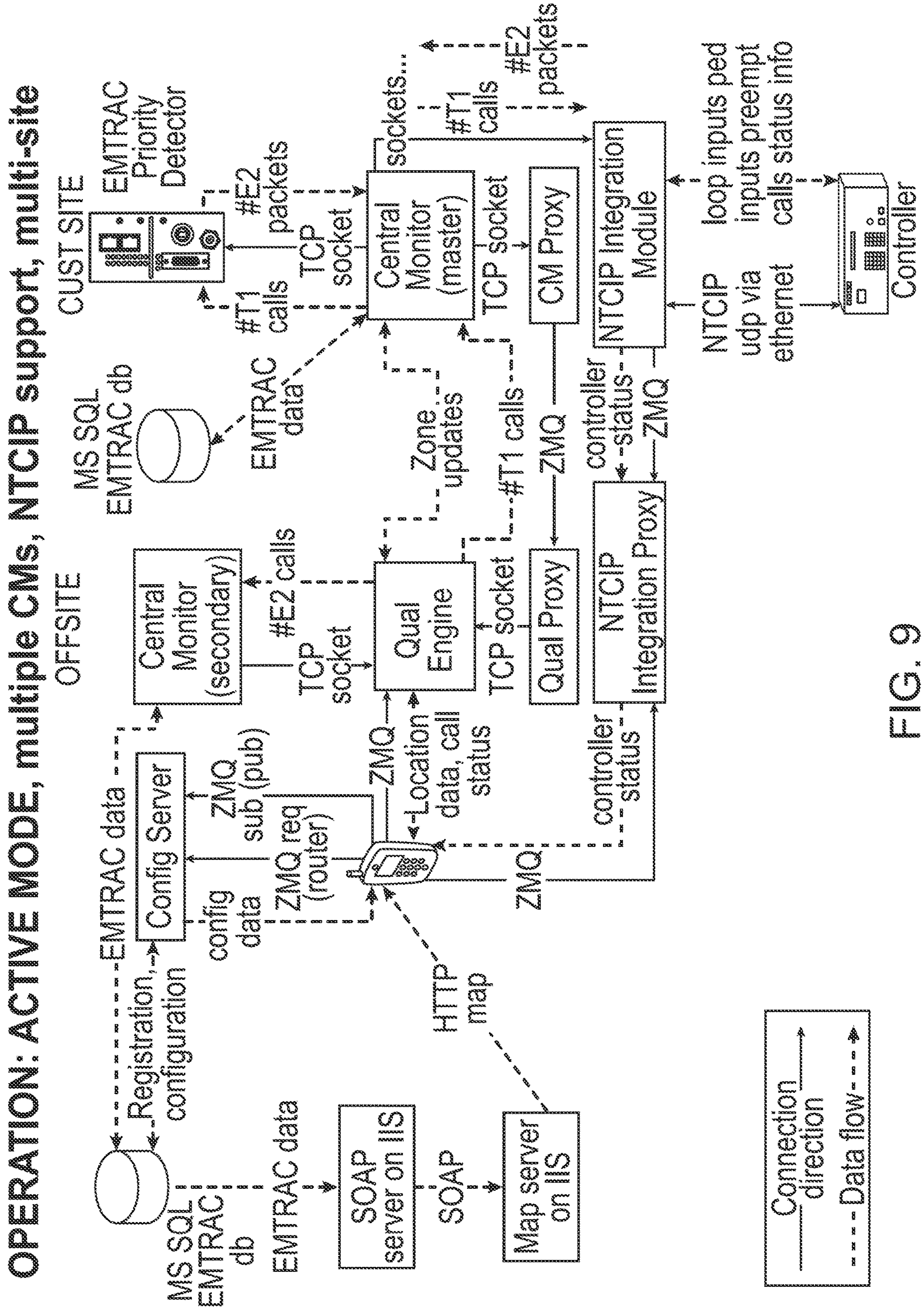
Figure 10:
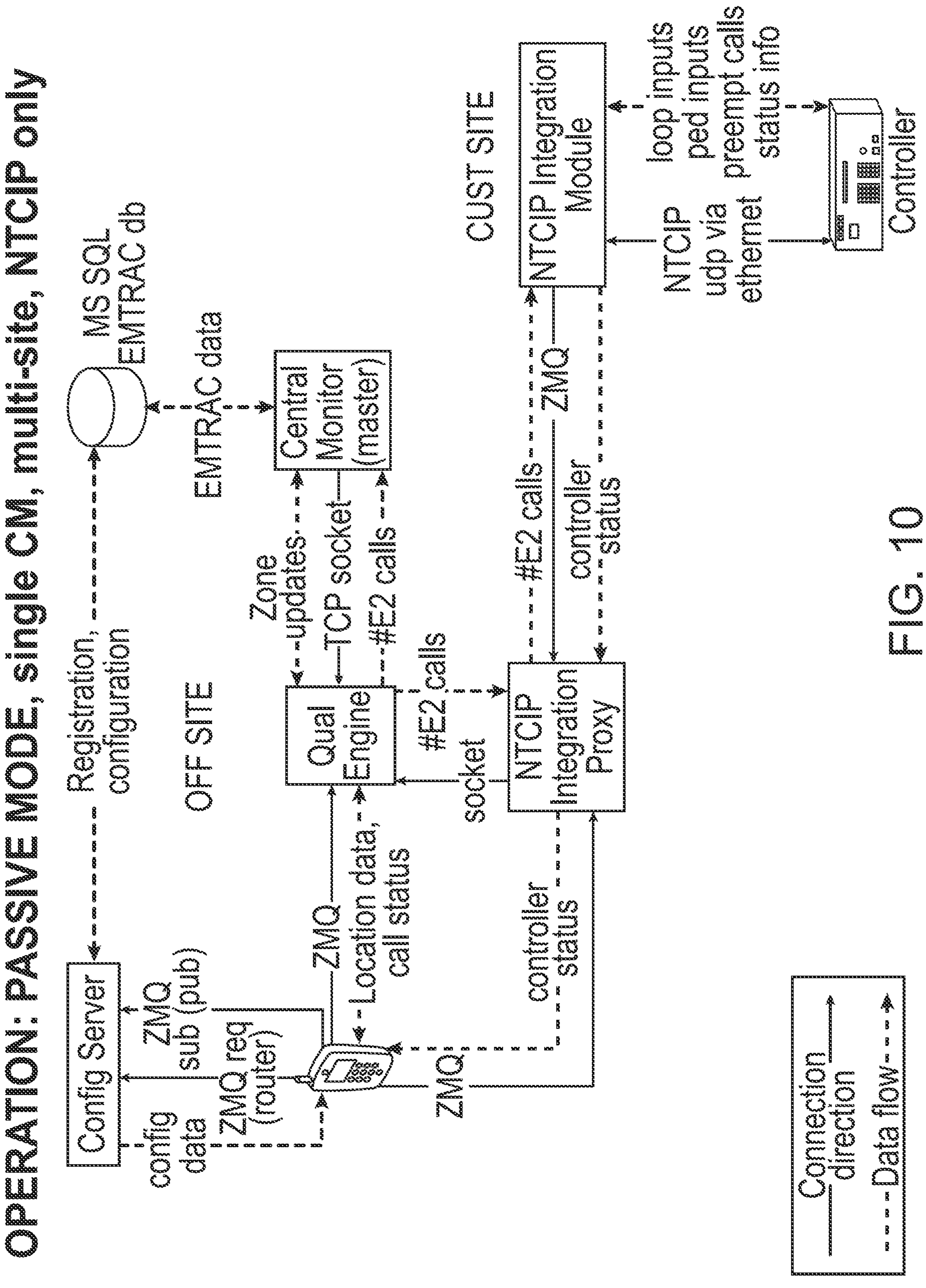
Figure 11:
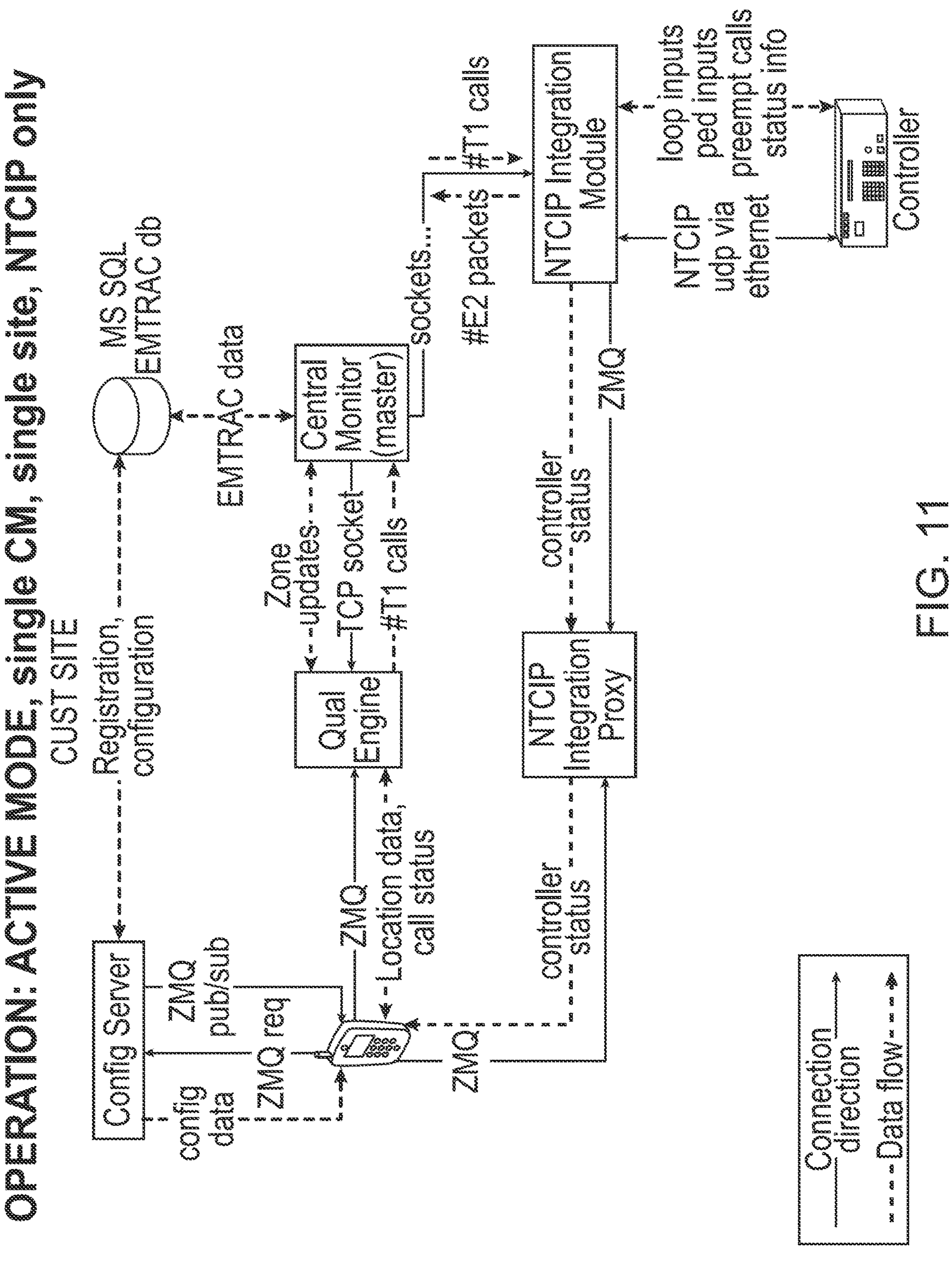
Figure 12:
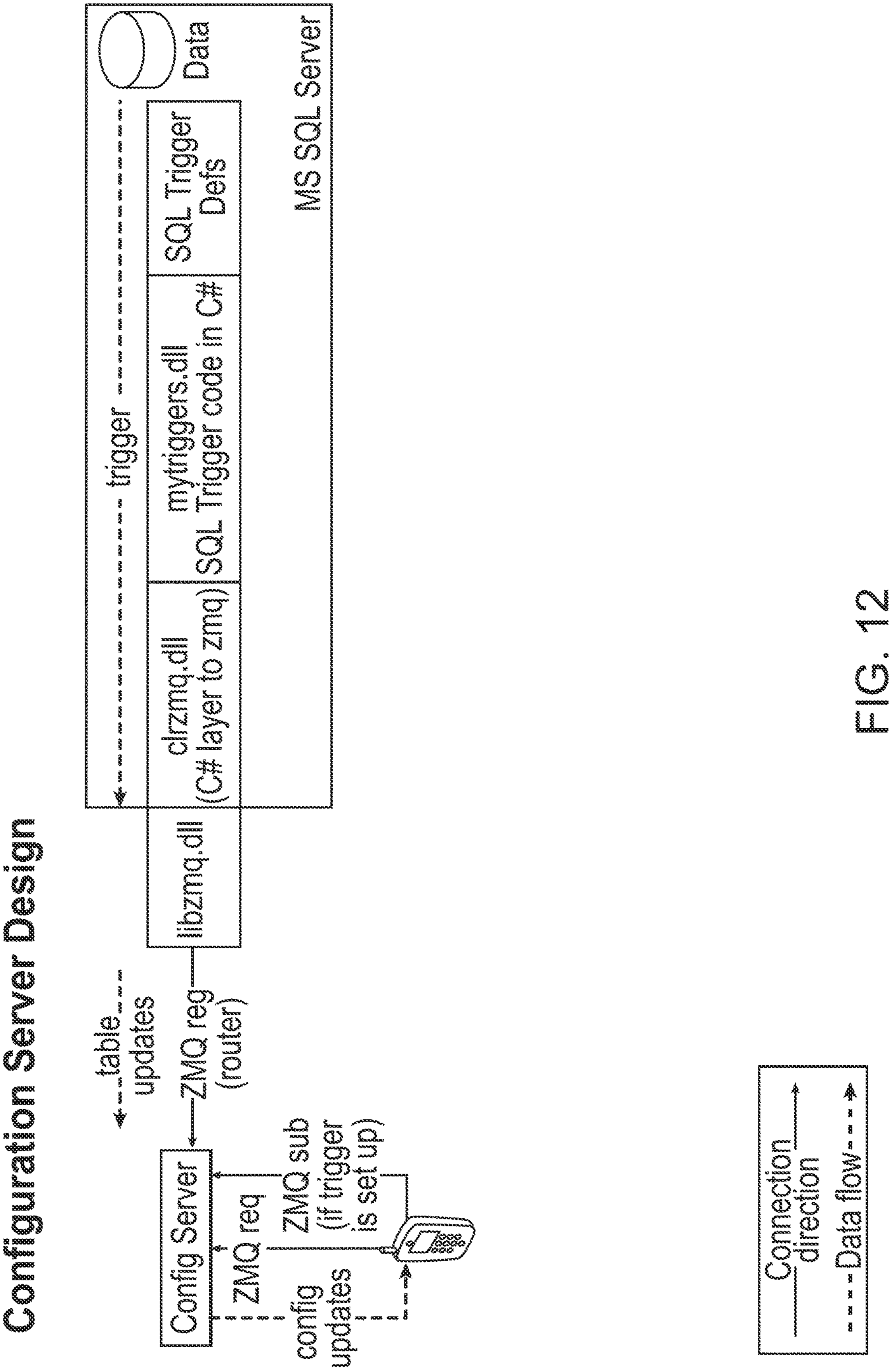

In an embodiment, such as those shown in FIGS. 1 and 2, a system (100) for detection of travelers at roadway intersections as disclosed herein is generally comprised of a mobile communication device (101) capable of determining its location in real-time, using location data from positioning satellites (102), inertial navigation, Wi-Fi, local radio location sources such as cellular signals (111), and/or by any other positioning methodology known to those of ordinary skill in the art and that is carried by the traveler. The mobile communication device (101) is generally also equipped with a computer operating system capable of running a third-party software application (110) (e.g., an "app"), which application is also part of the disclosed system (100). Further, the mobile communication device (101) will typically include a display or other interface, such as an audible interface, that may facilitate communications to the traveler from the traffic control system (100), and vice versa. The contemplated interface may take any form known to persons of ordinary skill in the art, including without limitation an electroluminescent display, a liquid crystal display, a light-emitting diode display, a plasma display, a quantum dot display, or any other display. The display may be visual or may stimulate an alternative sense such as the case of audible or tactile displays.

As will be discussed in detail below, the mobile communication device (101) may be capable of providing a traveler or a group of travelers feedback from the traffic control system (100). Such feedback may take many forms, as discussed herein. Overall, the ability of the traffic control system (100) to provide feedback to the travelers in the system (and for travelers to communicate with the system) improves the overall ability of the system to control traffic. Said another way, the process of providing travelers with feedback may tend to control the behavior of the travelers, which control may allow the system (100) to operate much more efficiently. The feedback may inform a given traveler about some aspect of the traffic grid, such as how long the traffic light that the traveler is approaching may stay green. The feedback may make suggestions to a given traveler, such as suggesting the traveler take a different route that is less congested. The feedback may offer the traveler a compromise, such as if the traveler slows down on their bicycle slightly, the bicycle will reach each upcoming traffic light without any red light and not have to stop until their final destination. The feedback further may indicate to the traveler if the traveler is maintaining the requested speed or if the system (100) would like to amend (up or down) the compromise speed. The feedback may take the form of a warning, such as warning the traveler that they will need to stop at the next intersection. The feedback may ask the traveler to confirm an assumption the system (100) is making about the traveler, the traveler's intended route, the traveler's intended destination, or other priorities or desires of the traveler.

This type of feedback may improve the overall traffic flow by improving the system's (100) ability to make predictions. In the end, the system (100) is unlikely to be able to force any human traveler to do much, other than perhaps stop at an intersection or maintain a speed below a legalized limit. However, the system (100) certainly can incentivize travelers to make certain decisions, or to perform certain behaviors, and may also learn more about the traveler to improve its ability to predict the traveler's behavior. For autonomous vehicles, however, the system (100) may be able to control many, in not all, aspects, of a given voyage through the traffic grid. In such a case, feedback may be given constantly to the vehicle, in effect, controlling the vehicle as a part of the greater traffic grid. This has the potential to lead to incredible efficiencies.

It should be recognized that mobile communications on a particular frequency are not determinative as it is contemplated that the mobile communication device (101) could also transmit communications via cellular, Wi-Fi, short-range UHF (i.e., Bluetooth), or any other transmission range or spectrum now known to those of skill in the art or later discovered. In an embodiment, the system (100) will actually utilize two different forms of communication with the mobile communication device (101). One form will be designed to be longer range to provide general location and other information, while a shorter range system may be used in proximity to some receivers (115) within the system (100). This sharing of communications channels may be used, for example, to save battery power in the mobile communication device (101).

In an embodiment, a plurality of traffic intersections (116) may be equipped with individual short-range UHF devices or receivers (115) so that when the mobile communication device (101) is within transmission range of a short-range UHF device (115), both the short-range UHF device (115) and the mobile communication device (101) may recognize their proximity to each other. Upon recognizing its proximity to the short-range UHF device (115), the mobile communication device (101) may be capable of increasing the occurrence of location-data and other data transmissions, which increase may allow it to preserve battery power by sending fewer occurrences of location data and other data transmissions when located far from intersections (116) or other equipped locations where detection is desired while still improving location, movement, and other information transmitted when the traveler is closer to the intersection (116).

In an embodiment, the system (100) will be further comprised of a plurality of priority detectors (103) that are generally located at various locations along vehicle roadways. Specifically, each of the priority detectors (103) will generally be associated with a particular traffic intersection (116). Generally herein, a traffic intersection (116) is defined as any point in traffic flow where any two travelers could be forced to interact with each other in a fashion where one would need to wait for the other. Thus, an intersection (116) may be a street and cross street, a highway interchange, an entrance or exit ramp, a rotary or roundabout, a driveway connection to a road, or any related or similar location. The present application is mostly, but not entirely, concerned with a traffic intersection (116) where there is at least one controllable traffic indicator present. This will generally be a standard three color (e.g., red, yellow, green) light system but may be a single color system (flashing or solid red) or a more complicated light system, for example, a system utilizing multiple arrows of multiple colors. Such a light may be a form of feedback from the system (100) to the traveler, which may allow the system (100) to influences the behavior of a traveler. In this instance, the light may prompt the traveler to, for example, stop at an intersection when the light is red.

A priority detector (103) may generally comprise a computer and related hardware infrastructure to allow for at least some control over the traffic control indicators of the given intersection (116). For example, one common location for priority detectors (103) will be at or in close proximity to intersections (116), inside traffic-controller cabinets (104), for example. Generally, these priority detectors (103) function as intermediaries in the overall system (100), forwarding pedestrian and vehicle-detection signals to a traffic signal controller, receiving signals from a central control server (105), or forwarding detection signals from a plurality of mobile communication devices (101) to the central control server (105).

One component of a priority detector (103) may be an intersection antenna (108). This intersection antenna (108) is generally any antenna known to those of skill in the art that is capable of receiving radio or other electromagnetic signals from the mobile communication device (101). In an embodiment, the intersection antenna (108) may be co-located with the priority detector (103). In other embodiments, the intersection antenna (108) may be located at a position removed from the priority detector (103). Generally, it is contemplated that the intersection antenna (108) may be located at any place near the applicable intersection (116) that would allow for the effective transmission and receipt of signals. For example, in certain embodiments it is contemplated that the intersection antenna (108) will be externally mounted on a signal light pole at the applicable intersection (116). In an embodiment, the intersection antenna (108) will be connected to the priority detector unit (103) by wire connections, such as, but not limited to, two coaxial cable connections, each of which carries a different type of communication signal (for example, one for UHF data and one for GPS data). In another embodiment, the intersection antenna (108) will be connected wirelessly to the priority detector unit (103) in a manner known to those of ordinary skill in the art. It should be recognized that communications technologies are always evolving and specific protocols or methods of communication, including any common carrier protocols or private protocols may be used in various embodiments of the system (100).

In order to associate a communicating mobile communication device (101) with an appropriate intersection (116), each intersection (116) will generally have one or more geographic areas where it is determined that travelers should be detected if the travelers are to interact with the specific associated intersection (116). As shown in FIGS. 1 and 2, these are commonly the areas of approach via roadways to the intersection (116) and are generally identified, defined, and saved by and in the system (100) as detection zones (107). The detection zones (107) are generally defined by their global coordinates and generally may take any shape (e.g., generally circular, polygonal, linear, etc.) to appropriately represent the various possible approaches to the intersection (116) in a way that makes sense based on the operation of the intersection (116). Multiple zones (107) may also be set up in a potentially overlapping configuration within the system-configuration software to elicit different responses from the system (100).

In the depicted embodiment of FIGS. 1 and 2, the detection zones (107) are arranged to extend along the flow of the roadway approaching the intersection (116). The detection zones (107) may be generally configured to activate a succession of communication signals from the mobile communication device (101), through any associated wireless network, to notify the central control server (105) that the mobile communication device (101) is within the detection zone (107) and/or how it is moving within the detection zone (107). In other embodiments, there are a number of conditions that may be configured, in addition to being located within a detection zone (107), before the mobile communication device (101) will activate the communication signals to the central control server (105). In other embodiments, the mobile communication device (101) may initiate the communications with the central server (105) and/or other components of the system (100) discussed herein.

It should be recognized that the central server (105) as depicted herein is as a physically definable computer system. This is not required as the functionality of the central server (105) as discussed herein may be spread across multiple machines, may be decentralized in the cloud, or may be controlled by a different company or user than other components of the system with these elements still behaving as the central server (105) is discussed herein. As such, the central server (105), and all the other specific machines contemplated in the various embodiments, can be thought of both as a specific machine carrying out the functions contemplated herein, as well as an abstraction for any combination of machine systems carrying out those same functions. Further, should it be desired, the central server (105) may have other functions beyond those contemplated here. For example, the central server (105) may obtain and store data on system (100) use, may perform analytics or other analysis on such data, and/or may utilize such data in a machine learning or similar algorithm to improve operation of the system (100) or related systems.

Detection zones (107) will commonly be designed so as to take into account the type of expected traveler to be approaching in a specific zone (107). Thus, one detection zone (107) may correspond to a particular portion of the roadway directed to traffic going straight through an intersection (116), while a different zone (107) may be arranged for traffic intending to turn at the intersection (116). In this way, the direction of a traveler in a particular zone (107), or out of the particular zone (107), may be inferred from the traveler's position. Similarly, a detection zone (107) may be arranged to cover a sidewalk but not a roadway. In this sidewalk detection zone (107), the traveler would not be expected to be using a motor vehicle, for example, and that may influence the decision on how the traveler is treated.

In an alternative embodiment, the mobile communication device (101) may be configured to activate communication signals only after determining that the mobile communication device (101) is traveling in a pre-defined direction, or within a defined directional range, while the mobile communication device (101) is within a given detection zone (107). Specifically, the mobile communication device (101) would only communicate with an intersection (116) if the mobile communication device (101) is both in the detection zone (107) for that intersection (116) and moving toward the intersection (116). It should be recognized that while the above is the most likely arrangement, any number of conditions may be configured to elicit the active response from the mobile communication device (101).

It also should be recognized that, in an embodiment, detection of a traveler that needs to interact with an intersection (116) will generally require two criteria. The first criteria for the embodiment is that the individual is near the particular intersection (116) and the second is that the traveler is approaching the intersection (116). The first criteria may be necessary so that the traveler only triggers an intersection (116) that the traveler will be next entering. In this embodiment, it is generally undesirable that the traveler activate an intersection (116) that requires the traveler to pass through a prior intersection (116) to interact with or to activate an intersection (116) the traveler is moving away from. The second criteria for this embodiment is that the traveler is actually moving toward the intersection (116) as opposed to a direction that will not take the traveler to the intersection (116). In other embodiments discussed herein, the traveler may be able to directly interact with one or more intersections (116) using the mobile communication device (101) regardless of proximity or direction relative to an intersection.

While it is desirable, in an embodiment, to allow intersections (116) to prepare for travelers that are not at the intersection (116) yet, this will most commonly be done by interaction between the priority systems at the various intersections (116). This is so that control of the various intersections (116) is dependent not on a single traveler, but a group of travelers local to the intersections (116) of interest. Specifically, if a first intersection (116) creates a platoon of vehicles or travelers to send to a second intersection (116), it is valuable that the second intersection (116) learn from the first intersection (116) the number of vehicles or travelers in the platoon and the time the platoon was released through the first intersection (116). This may allow the second intersection (116) to detect the approaching platoon and react accordingly based on its size and its distribution as it approaches.

In an embodiment, the central control server (105) receives the location and direction data that is sent from the mobile communication device (101) from the antenna (108) or other component of the system (100) and determines whether the data meets the defined criteria for transmitting the individual's presence to the corresponding intersection's (116) priority detector (103). Generally, receipt of this data will occur in real-time or near real-time as the mobile communication device (101) approaches the intersection (116). Further, in an embodiment, the central control server (105) is generally a computer or series of computers that link other computers or electronic devices together. Generally, any known combination or orientation of server hardware and server operating systems known to those of ordinary skill in art is contemplated.

In an embodiment, the central control server (105) is communicably linked to a plurality of priority detectors (103) in the system (100) by a wireless network or a combination of a wired and wireless network that allows for the free transmission of information and data, allowing centralized control of a number of signals. Further, in an embodiment, the central control server (105) is connected to a central monitor server (113) that contains a database of defined detection zone (107) locations, which is utilized to determine if the mobile communication device (101) is currently located in a detection zone (107).

In another embodiment, the central monitor server (113) is also connected to a plurality of central workstations (106) upon which a plurality of intersection (116) and mobile communication device (101) locations, and activity from a plurality of priority detectors (103) and mobile communication devices (101), may be depicted in real-time.

As shown in FIG. 2, the system (100) may additionally utilize a communications server (109), which is communicatively connected to the central control server (105) for the purpose of wirelessly transmitting information about detected devices to a plurality of intersection priority detectors (103).

The central control server (105) may be configured to send zone-location information for a particular region to the mobile communication device (101) so the software application (110) is able to calculate and determine whether it is currently in a detection zone (107), as well as if any other required parameters are being met that will activate the mobile communication device (101) for sending communications signals to the central control server (105) or other component in the system (100).

In order to identify individual travelers, a software application (110) (or hardware equivalent) is generally installed on the mobile communication device (101) for the purpose of determining the individual traveler's global position and direction of travel, and transmitting this information to the central control server (105) or other component in the system (100) used to receive this information. This may be a form of feedback from the traveler to the system (100), which feedback may assist the system (100) in managing traffic flow through the traffic grid.

In another embodiment, the software application (110) is also utilized to determine whether the traveler is within a pre-defined detection zone (107) and/or proximate to an intersection (116) or other wayside location. The software application (110) then may assist in determining whether the mobile communication device (101) should actively transmit the traveler's location to the central control server (105) so that pedestrian and vehicle detection signals may be communicated to the corresponding wayside priority detector (103) and, thus, forwarded to the intersection signal controller. This software application (110), or hardware implementation thereof, may be designed to be always running. In effect, the central control server (105) may detect the presence and movement of the mobile communication device (101) regardless of its current operating state. For example, the central control server (105) could simply track any device currently broadcasting some specific signal, for example a cellular signal, or capable of receiving a ping signal on a particular network (for example a Bluetooth™ request to connect). In other embodiments, the mobile communication device (101) may be capable of facilitating communications between the traveler and the system (100).

Alternatively, the software application (110), or corresponding hardware implementation, could be required to be activated to communicate and be detected by the central control server (105). The two options could also be used together, for example, where the former provides more basic detection and the later provides more detailed data. U.S. Pat. No. 9,916,759, the entire disclosure of which is herein incorporated by reference, provides for examples of how the motion of a detection device within a detection zone (107) may be used to determine the position and arrival time of a traveler in the present case.

One problem that exists in detecting a traveler is determining their intent at an intersection (116). Particularly when an intersection (116) is designed with specific lanes or sidewalks for non-motorized travelers (as many modern streets are) it may be difficult to determine the direction of travel of a traveler through the intersection (116). For example, a traveler approaching an intersection (116) from the South going North is highly unlikely to leave the intersection (116) going South. However, the traveler may go straight through the intersection (116) (North), turn right (East), or turn left (West). Sometimes this problem may be solved by road design. For example, if a bicycle is in a traffic lane, the system (100) may be able to change the light in the same manner as it would for a motor vehicle in the same lane. Similarly, for a one-way road intersecting with another one-way road, the intent of the traveler to go straight or turn may not matter since both activities are allowed with the same signal.

In an alternative embodiment, the system (100) may infer the traveler's intent based on the traveler's observed behavior at the intersection (116) and the road structure. For example, if a bicyclist approaches the intersection (116) in a protected bike lane on the right side of the road and may turn right to another protected bike lane on the cross street, the bicyclist may do so even if the light is red and without slowing down. Thus, if the traveler approaches the intersection (116), stops, and does not continue to turn right, the system (100) may make the assumption that the traveler is intending to go straight through the intersection (116). This assumption is based on the fact that the traveler (a) did not turn right and (b) is in a protected lane on the right side of the road that would require the traveler to turn left across traffic in the same direction of flow as the traveler, which is highly undesirable.

In a still further embodiment, which is discussed in detail below, the mobile communication device (101) may provide for controls that allow for a traveler to indicate to the signal lights the traveler's desired activity at the intersection (116). For example, the mobile communication device (101) may receive an inquiry from the priority system as to what the traveler wishes to do. The system (100) may then provide feedback to the traveler, such as informing the traveler that the system (100) would like to determine what the traveler's intention is in traveling in the traffic grid. This feedback may assist the system (100) in controlling the actions of the traveler. For example, the system (100) may cause the mobile communication device (101) to display symbols and/or text on the screen, which symbols and/or text may give the traveler an opportunity to indicate to the system (101) it's planned route or path to a destination. The traveler may then use the mobile communication device (101) to indicate the traveler's intention, a form of feedback from the traveler to the system (100). For example, if the traveler wishes to go straight, the traveler could take no action. If the traveler wishes to go right, the traveler could tap a large right arrow on the screen of the mobile communication device (101), swipe the screen to the right, or swing the mobile communication device (101) to the right. A similar option could exist for a left turn. In this way, the system (100), based upon the feedback from the traveler, does not provide a traffic cycle at the intersection (116) that is not useable to any motor vehicles or the bicycle.

Systems (100) may also integrate with known mapping software to determine a proposed route. If the traveler had a route currently open that indicated that they should turn right at the intersection (116), the system (100) may presume the traveler is intending to turn right and plan accordingly. This information learned from data on the traveler's mobile communication device (101) constitutes another form of feedback from the traveler to the system (100). This form of feedback may be automatically gathered by the system (100) from the mobile communication device (101), or may be gathered when given permission by the traveler. In some embodiments, the system (100) may indicate to the traveler via the mobile communication device (101) the route determined by the system (100), and/or the system (100) may prompt the traveler to allow the system (100) to review the traveler's navigation data and/or confirm that navigation data.

In a still further embodiment, the system (100) may get information from the mobile communication device (101) which is obtained from another system utilized for the traveler. For example, there are systems which provide for lighted turn signals for bicyclists, for example, while they are riding. Activation of such a system to indicate a right turn could be collected by the mobile communication device (101) and used as an indication that the traveler is intending to turn right at the intersection.

The system (100) accurately predicting a traveler's approach to an intersection (116) may be much more important for travelers in non-motorized vehicles than those in motorized vehicles. While motorized vehicles may leave a roadway for various reasons (e.g., to park), the vast majority of motorized vehicles that pass through a first intersection (116) will still be travelling at the next in-line intersection (116). A motorized vehicle also will not commonly change direction in a short distance between intersections (e.g., not make a "U-turn" in the middle of the street). However, this is often not true of non-motorized travelers, and particularly pedestrians. Pedestrians may stop, change direction, or go off the roadway with much more frequency than motor vehicles. Thus, it is very desirable in a traveler detection system to determine if a pedestrian is intending to pass into an intersection (116), or is simply nearby the intersection (116), but doing something else.

In an embodiment, the traveler's facing direction may be determined by evaluating if the traveler turns at a given corner to face a different direction than the prior one of travel, or if the traveler indicates with their mobile communication device (101) the direction the traveler would like to go. Either action may be detected by internal sensors in the mobile communication device (101) and activate based on that detection, or may give the traveler a button, physical or displayed on the mobile communications unit (101), to indicate their desired direction or route directly. The displaying of the button itself may be considered to be a form of feedback from the system (100) to the traveler, at least because the displaying of the button indicates that there is a decision to be made in the near future and that the system (100) does not yet know what the traveler would like to do. Such a button may also be provided because the location of the traveler is detected as sufficiently close to the intersection (116) for the system (100) to believe that the traveler would like to use the intersection (116). Existing mapping software with route planning may also provide an expected indication of the traveler's intention at the intersection (116) by assuming the traveler is intending to follow the selected route. The use of buttons or mapping software constitutes another form of feedback from the traveler to the system (100), which feedback allows the system (100) to potentially improve traffic flow across the traffic grid.

A problem with pedestrians approaching an intersection (116), however, is determining which way the traveler wishes to go. Some travelers may go straight through the intersection (116) (needing to utilize a crosswalk in a first direction), while others may wish to turn (generally left in the United States) and go through the intersection (116) (needing to utilize a crosswalk in the opposing direction), while others may turn (generally right in the United States) to walk away from the intersection (116) without having to enter it (needing no crosswalk). As opposed to roadways, sidewalks will generally not have turn lanes or specific waiting areas for specific directions, so the desire of the pedestrian may generally only be determined when the pedestrian reaches the intersection (116) or gets very close to it. However, the determination may often be made quickly. For example, a pedestrian wanting to go the direction where the crosswalk is currently available ("WALK") will generally not slow down as they approach the intersection (116) and will simply pass immediately into the crosswalk. Similarly, a pedestrian turning away from the intersection (116) will also generally not slow down or stop. Only a pedestrian wishing to cross the currently unavailable crosswalk will generally slow down and stop. As only the pedestrian of the final case requires a modification of the traffic signal, the first two groups may actually be ignored in determining priority of signal as they currently have it. Similarly, a pedestrian that accelerates their pace as they approach an intersection (116) will typically want to cross the intersection in the direction that currently has an available crosswalk, while one that slows down will often want to utilize the direction where the crosswalk is currently unavailable.

Figure 13:
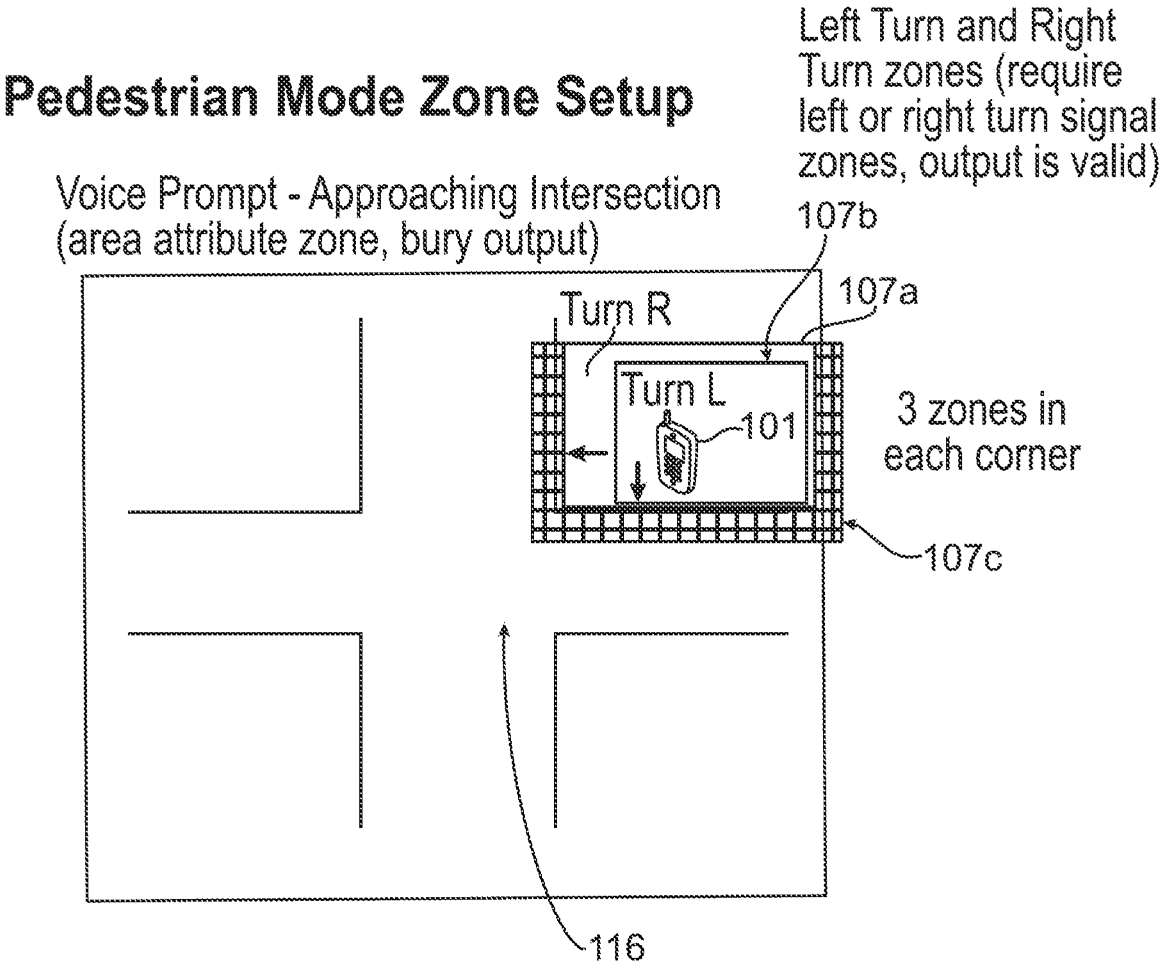
FIG. 13 shows an embodiment of an overlapping detection zone arrangement for pedestrians.

FIG. 13 gives an example of multiple zones (107) which may be overlapped to assist in detection of the desired movement of a pedestrian. In the embodiment of this FIG. 13, the three zones (107*a*), (107*b*), and (107*c*) are overlapping and positioned on a corner to intersection (116). Here, the presence of a mobile communication device (101) within a particular zone can be used as a first instance to determine the expected area of travel. Specifically, a mobile communication device (101) only in zone (107*a*) would be expected to turn right while a mobile communication device (101) in both zones (107*a*) and (107*b*) may be expected to turn left. However, when in the dual zone (107*a*) and (107*b*) area (where the mobile communication device (101) is shown) the direction of travel may not be clear. However, the motion of the device within the zone (e.g. in the direction of the arrow within the zone) can provide further indication. The peripheral zone (107*c*) may be designated as a zone where a user prompt is necessary. In this zone (107*c*) the action of the user may be difficult to predict. Further, as zone (107*c*) extends into the street itself, a user in this zone may need to be warned that they are in a dangerous area and should leave it.

In general operation, the system (100) may operate as follows with reference to FIG. 1. At the particular intersection (116) in the depicted embodiment there will at a certain time be a plurality of travelers in proximity to the intersection (116). These travelers will generally be in detection zones (107) associated with the intersection (116) and may be travelling in a variety of different lanes and at different speeds. An antenna (108) may detect signals from at least one of the travelers indicating that the traveler is in the detection zone (107), approaching the intersection (116), and is doing so at a particular speed.

One of the benefits of placing the detection on a mobile communication device (101) is that it allows the intersection (116) to take into account the movement of individuals, as opposed to vehicles. Specifically, the individuality of the detector allows for determinations based on person flow, as opposed to vehicle flow. In standard traffic control systems, the default measurement is the vehicle, particularly the motor vehicle. Thus, such a system will act to accommodate the greatest vehicle flow. This is, however, not necessarily efficient. For example, three city buses will generally be carrying far more passengers than three small cars. Thus, there may be a desire to move the buses through an intersection (116) first to get more people to their target destination quicker.

The system (100) may take the information from all travelers approaching the detection zone (107) and determine the appropriate arrangement for the signals at the intersection (116). This determination may commonly take into account when the various travelers are expected to reach the intersection (116) and may account for travelers that will need to slow down or stop before they reach the intersection (116) with a particular configuration of signals. Based on this evaluation, the central controller (105) may make a determination of how to alter (if at all) the current signal pattern at the intersection (116) and will instruct the local priority detector (103) to make such a change.

This calculation will generally take into account certain variables for the traveler and some default variables. The default variables may include the current configuration of the lights at the intersection (116) (which provides travelers in a current direction current priority), the minimum and maximum times that any current configuration may or should be maintained, and the time it takes to transition the intersection (116) between any different configurations, among other considerations. The variables for the traveler will generally comprise which detection zone (107) they are in, their relative speed (or time to arrival at the intersection (116)), and their direction of travel, among other considerations. In many situations, the presence of a traveler in a certain configuration will result in the traveler being eliminated as being a traveler for purposes of controlling the intersection (116). For example, a pedestrian standing still will generally be ignored and not treated as a traveler until the pedestrian moves.

Control of the intersection (116) will generally be based on the available phases at the intersection (116), as well as interaction of phases and rings. This control scheme may be complex, but ultimately the arrangement of any intersection (116) may be broken down into simpler steps to provide for a series of phases that are considered safe operations. For example, at a four-way intersection (116) (having North, South, East, and West directions) with each direction having a left turn lane and signal, and each direction having a crosswalk, the phases of the direction looking North into the intersection (116) to allow a vehicle in the roadway to turn West (left) may have the following "safe" options: (a) North turn arrow only with no crosswalk access; (b) North and South turn arrow together with no crosswalk access; (c) North turn arrow and straight together with no crosswalk access; (d) North turn arrow only with East Side crosswalk access; (e) North turn arrow only with East side and North side crosswalk access; (f) North turn arrow and straight together with East Side crosswalk access; and (g) North turn arrow only with North Side crosswalk access.

As should be apparent, the "safe" options above may be broken down into their component parts (e.g., North turn arrow), and the parts may be presented in any combination, recognizing that unsafe combinations would be excluded. The phase to be activated (the collection of component parts) may then be selected based on the position and relative movement of travelers. Generally, the phase will be selected to move all waiting or approaching travelers through the intersection (116) with as little delay as possible. Thus, if there is a vehicle turning from North to West, the left turn arrow will be activated. However, the activation of any other light or signal will generally not occur unless there is also a traveler waiting for that signal. Thus, if there is just the single vehicle waiting, phase (a) may be selected as the next phase. If there is also a pedestrian waiting to cross the North side as well, option (g) may be used instead.

The selection of phase will generally be the minimum activation to move all waiting travelers that are desired to be moved in this iteration, recognizing that a traveler may have to wait through one or more phases before being allowed to proceed. This waiting may be required by the system (100) to deal with opposing needs. For example, a traveler wishing to cross the South side crosswalk cannot go at the same time as the above turning vehicle, as the traveler would cross right through the path of the turning vehicle. Thus, one traveler must go through the intersection (116) first and the other traveler second. This may be the assignment of priority between the various travelers. While activation in the phase is generally selected to be the minimum to allow for all travelers to pass, this is not required and additional directions of travel may be provided if desired, even if no traveler is expected to use the extra phases.

The assignment of priority to the travelers may depend on a variety of factors. Generally, the priority may be assigned to move travelers through the intersection (116) with the minimum amount of slowdown across all travelers, but also including a position where any individual traveler will not be forced to wait more than a predetermined maximum time. The priority, thus, will often be assigned by the number of travelers approaching in a particular direction, when each traveler will reach the intersection (116) within their detection zone (107), the traveler's desired actions at the intersection (116), and if a particular traveler should have an increased or decreased priority for some reason (for example giving priority to a mass transit vehicle, emergency vehicle, electric vehicle, slower vehicle, or smaller vehicle), among other considerations.

As an example, presume there are four travelers approaching an intersection (116) having a North-South street and an East-West street which cross. The first traveler (A) is in the detection zone (107) approaching the intersection (116) from the South going North. Based on traveler A's distance and current speed, traveler A will reach the intersection (116) in 10 seconds. A second traveler (B) is approaching the intersection (116) from the North going South. This traveler is going much slower and will reach the intersection (116) in 40 seconds. There are also two travelers (C) and (D) on the cross street who are both approaching the intersection (116) from the West going East. They will each reach the intersection (116) in 20 seconds, as they are going the same speed as traveler A, but have just entered the detection zone (107). The signal is currently green for East-West traffic and takes 10 seconds to change.

Based on the above, the system (100) may leave the light as it is for 20 seconds. This would allow travelers C and D to go through the intersection (116) while traveler A is forced to stop. The system (100) may then change the signal. This change would allow traveler B to go through the intersection (116) without stopping and also allow traveler A to resume and go through the intersection (116) having only been forced to wait 20 seconds (plus the 10 seconds it took traveler A to reach the intersection (116)).

This traffic pattern would generally produce the least amount of forced slowdown between vehicles (as only traveler A had to wait, and only for a total of 20 seconds). Compare this to a standard detection system as presently used and the benefit becomes apparent. In a prior system, the light would stay as it is until traveler A stops at the intersection (116). Traveler A would wait 10 seconds for the light to change and then go though. As soon as the light changes, travelers C and D would arrive at the intersection (116), and they would then wait for traveler A to go through and for the 10 seconds as the light changes. The same waiting situation then would happen to traveler B. Thus, the total wait time for the four travelers would be over 40 seconds.

The system (100) may allow for the much slower vehicle (traveler B), which may be a bicycle or pedestrian, to not have to stop while the fastest vehicle (traveler A) is the only one slowed down. Further, traveler A, because the light was already red as they were approaching, was likely already slowing down anyway. Thus, when the hypothetical prior system tried to switch over to allow traveler A through, it resulted in all the travelers having to stop instead of just one.

Another key difference between the above example of the system (100) described herein and a prior system is the detection of traveler B. In a standard looped ring system, for example, none of the travelers would have yet been detected. Traveler A would trigger the system first causing the light to change to allow them through. Travelers C and D would then likely trigger the system to change to allow them through. Traveler B, upon reaching the intersection (116), would find the light against them, and would have no way to change the light if they were not detectable and would be forced to wait for a detectable vehicle to approach from the North or South.

As should be apparent, in the above situation, most of the travelers are alone. However, travelers C and D are moving together. As travelers C and D represent two travelers, there is some desire to make sure their motion is unimpeded as they may double the amount of efficiency from it. Such focus, as discussed above, on enhancing the efficiency of groups of people travelling together (e.g., travelers C and D) and on slower vehicles (such as B) may actually result in an implicit encouragement to further increase efficiency. For example, having traffic signal activation encourage constant movement of bicycle speed traffic at the expense of single motor vehicles may result in encouraging commuters to use bicycles. Similarly, the use of more efficient mass transit and carpool vehicles may be encouraged through the use of such situations that prioritize mass transit and carpool vehicles.

An advantage of using a priority system assigned to each individual traveler as opposed to other forms of traffic light control is that a priority system may utilize a ladder of priorities and may have priorities interact. For example, should an emergency vehicle be coming, it may be given priority over everything else. Notifications may also be provided by the system (100) back to the mobile communication device (101) that there is an emergency vehicle approaching and the mobile communication device (101) associated with the traveler will not be given priority. Thus, a bicycle may have their mobile communication device (101) sound and vibrate as the bicyclist approaches the intersection (116) to warn the bicyclist not to attempt to go into the intersection (116) and that they will need to slow down. This may be a form of feedback from the user to the system (100), which feedback may assist the system (100) in managing traffic flow through the traffic grid. In this instance, the feedback may warn the traveler that they will need to stop at the upcoming intersection. Secondarily, a city planner may then give a particular form of transportation a priority to encourage its use or based on its expected use. Thus, small vehicles could have priority during rush hour to encourage their use (like high occupancy vehicle (HOV) lanes). Similarly, mass transit vehicles could have a tertiary priority for the same reason.

Priority systems such as the above also allow for prioritization based on the amount of travelers as opposed to the amount of vehicles. As contemplated previously, the present systems (100) may act to disconnect the traveler from their vehicle. In many respects, the system (100) may not care how the traveler is arriving at the intersection (116), only that the travelers are arriving and when (or at what speed). This may allow for simplification of the priority algorithms to improve the priority of the most number of individuals (travelers) as opposed to the most vehicles. For example, the present system (100) may generally treat a bicycle and a car each having a single individual as each being one traveler, even though the different vehicles may have different speeds and potential positioning on the roadway.

While disconnection of the traveler from the vehicle in a particular embodiment may be desirable, knowing that the traveler is associated with a particular type of vehicle and that the traveler is currently within that vehicle may provide for still further priority refinement. For example, a municipal vehicle, such as street sweeper, may be identified by the owner of a mobile communication device (101) being a municipality. This traveler may be given priority only if such a mobile communication device (101) is known to be in a particular vehicle, namely in a municipal vehicle that also includes a transmitter and is in communication with the mobile communication device (101), the central control system (105), and/or other component of the system (100). Still further, 15 people in individual cars may be treated the same as a single bus with a driver and 14 passengers, as each involves 15 travelers. Alternatively, the bus may be given priority because a signal identifying the bus may be received in addition to the signal identifying each passenger. This could also be used to give priority to a fuller (more utilized) bus than one which is more empty. Based on the treatment of travelers and not vehicles, it should be readily apparent that systems designed to maximize traveler efficiency may commonly encourage alternative modes of transportation. A group of slower moving pedestrians may gain priority over a single motor vehicle driver, as the pedestrians will be in a group at the intersection, while motor vehicles may be spread out. Similarly, a bus or other mass transit vehicle may have priority over passenger cars even if it is not identified as a bus specifically. Further, in an arrangement, people carpooling may actually be given priority over those who are not (as a car with four people may be treated the same way as four individual cars for purposes of priority).

Priority systems may also allow for on-the-fly adjustments of priority based on changing circumstances. As contemplated above, to encourage motor vehicle efficiency, motor vehicles may be grouped or "platooned" in going through consecutive intersections (116). In this way, motor vehicle operators will generally stop at a fixed number of lights (often only one or two) through a large number of intersections (116), so long as the motor vehicles travel at around a predetermined speed. Small vehicles (particularly non-motorized ones such as bicycles) will often travel slower than this speed. However, in a priority system, small vehicles may also be platooned, and then the small vehicle (slower moving) platoon may then have a higher priority when the small vehicle platoon approaches the next intersection (116) compared to a platoon of similar size travelling faster. What this may create is a system where motorized vehicles travel efficiently but may have to stop at an additional light or two, while non-motorized vehicles effectively flow as platoons around the platoons of motor vehicles without having to stop. This flow may make the transportation of all travelers more efficient. A traveler may be notified by the system (100), in a form of feedback, that they are a part of a given platoon. Such notification may be any indication on the traveler's mobile communication device (101), such as a displayed indication on the screen or a sound, vibration, or other means of notifying the traveler.

As a simple example, if the predetermined speed for motor vehicle platoons is 40 miles per hour, and the predetermined speed for non-motorized vehicle platoons is 15 miles per hour, a motorized vehicle platoon may have to stop at an additional intersection (116) to allow for the non-motorized platoon to maintain speed on a cross street even though other motorized platoons have already passed that same intersection (116). However, due to the speed differential, the motorized platoon will be differently positioned relative a non-motorized platoon at the next intersection (116) and will generally not interact with the non-motorized platoon, allowing the motorized platoon to potentially get multiple lights ahead of the non-motorized platoon.

In one embodiment, the disclosed system (100) and method may be carried out as follows: the software application (110) is installed and run on a mobile communication device (101). Through communication with the central control server (105) or other component of the system (100), the software application (110) may determine the current device location, direction of travel, and/or approximate speed of travel, referred to in this embodiment as "location data". The software application (110) may periodically transmit this location data, along with a unique ID number that serves to identify the mobile communication device (101), through a cellular or other network to be received by the central control server (105) or other component of the system (100). The central control server (105) may receive and queue the plurality of periodic transmissions and/or run qualification algorithms to determine if the mobile communication device (101) is in a detection zone (107) and/or meets any other pre-defined parameters. Upon determining that the mobile communication device (101) meets the location and pre-defined parameters, the central control server (105) or other component of the system (100) may create a location message based on the received location or other data and may relay the message, typically over a private data network (for example, the city traffic network), to the priority detector (103) for the corresponding intersection (116).

In one embodiment, a web proxy server (112), which may serve as a security barrier between the internet and the central control server (105), may receive the location or other data from the mobile communication device (101), create a location message, and/or send that message to the central control server (105), which may run qualification algorithms to determine if the mobile communication device (101) is in a detection zone (107). FIGS. 3-12 provide embodiments of exemplary traffic preemption system that lay out communications diagrams for such processes.

In another embodiment, the central control server (105) may be connected, typically through the private network, with a central monitor server (113), which may provide for the display of real-time detected individual locations, as well as retrieval of intersection activity logs, program updates, the configuration of system settings, and other information. The central monitor server (113) may also be connected to a plurality of computer workstations for further display of this activity.

In another embodiment, the software application (110) on the mobile communication device (101) may be capable of displaying a confirmation message or screen to notify the traveler that their device is within a detection zone (107), as well as additional status information, including whether the device has transmitted its location data, whether the device's presence has been recognized by the priority detector (103) or traffic controller in the intersection control cabinet (104), or other status information received from components of the system (100), such as equipment in the traffic control cabinet (104). This received information may originate from the central control server (105), the priority detector (103), external traffic network servers, and/or other components of the system (100). In this embodiment, an audible alert may be sounded in accord with the confirmation message or screen. This may be a form of feedback from the system (100) to the traveler, which feedback may assist the system (100) in managing traffic flow through the traffic grid.

In another embodiment, briefly introduced above, the software application (110) on the mobile communication device (101), in conjunction with other components of the system (100), may be capable of acting as a proxy for a traffic light indicator or a crosswalk indicator. Such indications may be displayed to the traveler having the mobile communication device (101) on or through the mobile communication device (101). This too may be a form of feedback from the system (100) to the traveler, which feedback may assist the system (100) in managing traffic flow through the traffic grid.

The construction and operation of a typical crosswalk indicator will now be discussed to provide some context for the potential operation of the software application (110) on the mobile communication device (101). First, crosswalk indicators are typically placed on or around sidewalks proximate to intersections (116). Crosswalk indicators are typically constructed as lighted signs that are attached to poles that support the intersection's (116) traffic signal lights, to freestanding poles used primarily to support the crosswalk indicators, or to some other structure. The lighted signs themselves will typically display at any given time one of two indicators, the first indicator suggesting that a pedestrian may walk across the crosswalk and the second indicator suggesting that a pedestrian wait until the traffic signal light has changed. Further, the crosswalk indicators may also include a timer that displays how much time remains for the pedestrian to cross the crosswalk, should they choose to do so. Moreover, the crosswalk indicators may include a demand button, which button is discussed extensively in this application. Crosswalk indicators may also flash or have an alternative mode of display. For example, a flashing "DON'T WALK" symbol is typically used in the United States to indicate that the light is soon to change and those in the crosswalk should clear the crosswalk while no new travelers should current start using the crosswalk.

To simulate a crosswalk indicator, the software app (110) on the mobile communication device (101) may facilitate any or all of the above-discussed functions of a crosswalk indicator, as a form of feedback from the system (100) to the traveler, which feedback may assist the system (100) in managing traffic flow through the traffic grid. As an example, in an embodiment, a traveler on a bicycle is carrying a mobile communication device (101) that includes the app (110), which app (110) has been turned on and is currently functioning. First, the app (110) may connect with the central server (105) or other component of the system (100) so that the traffic control system (100) may register that the traveler is in the traffic control system (100) and may begin to assist in routing the traveler through various intersections (116). Further, at this stage, at any time during the traveler's travels, the traveler may indicate to the system (100) to where the traveler would like to travel. For example, the traveler may use the mobile communication device (101) to set a planned route and destination into a navigation app, which app may work in combination with the software application (110) of the system (100). In such a case, it will be known to the system (100) where the traveler will likely be heading and what turns the traveler is likely to make. In other embodiments, the traveler may not indicate to the system (100) the destination to which the traveler intends to travel. In this case, the system (100) may have to infer from the traveler's positioning and other behavior where the traveler would like to travel.

The traveler may then begin (or continue) their travels. In an embodiment, the app (110) on the mobile communication device (101) may communicate, as feedback, a variety of information to the traveler. This indication may be communicated in a visual form (using, for example, a display of the mobile communication device (101)), in an audible form (using for example, some speakers of the mobile communication device (101)), in a haptic form (using, for example, a vibration mechanism of the mobile communication device (101)), or in any other form as would be known to a person of ordinary skill in the art. In other embodiments, such indications may be made in whole or in part by a related vehicle, such as a smart bike or smart scooter.

Further, such indications may mimic those found on a typical crosswalk indicator. For example, the mobile communication device (101) may show on its display either a "WALK" or a "DON'T WALK" signal, indicating that the traveler may cross the crosswalk or not cross the crosswalk, respectively. In other embodiments, the mobile communication device (101) may show other information including without limitation an estimated time of arrival at the next intersection (116), an estimated time of arrival at the final destination, an estimated time remaining on a green light or "WALK" signal, and/or other information.

As the traveler travels towards a given intersection (116), the traveler may enter into a detection zone (107) and be detected by the system (100). In this example, the traveler has set their final destination and communicated their preferred route to the system (100), and accordingly, the system (100) is cognizant of where the traveler would like to turn. In this example, as the traveler approaches a first intersection (116) at which the traveler will go straight through, the system (100) may assign a priority to the traveler on their bicycle. As an example, in this case, the system (100) will assign a relatively high priority of 2 to the traveler. As the first intersection is approached, the app (110) may communicate with the traveler, informing them that the light at the first intersection (116), which is currently red and "DON'T WALK," will turn green and "WALK" before the traveler is estimated to arrive at the first intersection (116). For example, the display of the mobile communication device (101) may display a signal that states that the signal light will be green and "WALK" upon encountering the intersection (116) if the traveler maintains current speed. Accordingly, the traveler, now armed with the knowledge that the signal light will be green and the crosswalk indicator "WALK" at the intersection (116), may continue towards the intersection (116) without slowing down because the indicators will allow passage before the traveler's arrival. Note that the system (100) may continue to monitor the status of the traveler and the intersection (116) to ensure that its predictions are accurate. In the event that the system (100) subsequently makes a new or different prediction, the status displayed on the mobile communication device (101) may change or other alerts may sound. For example, in the situation where an app (110) has indicated that a light will be green and a crosswalk indicator "WALK" for a traveler but, based on new actions, the system (100) now knows that this will not be true, the app (110) may indicate a new indication that informs the traveler that they must stop at the intersection (116). This new indication may be accompanied by (or replaced with) other warnings, such as an audible tone and/or vibrations.

To continue the above example, the traveler has now traveled through the first intersection (116) and is now entering another detection zone (107) for a subsequent, second intersection (116). The system (100), because it has the traveler's route information, understands that the traveler will be making a left turn at the second intersection (116). As a result, the system (100) may cause the app (110) to display an indication for the traveler on the mobile communication device (101) that informs the traveler that a left turn is to be made at the upcoming second intersection (116), as a form of feedback from the system (100) to the traveler. This notice may inform the traveler that they should move to the left hand turn lane, for example, and then monitor that they have done so. Once the system (100) has detected that the traveler is in the left hand turn lane, the system (100) may now make sure that the left hand arrow light is illuminated even when the traveler has not triggered an in ground detector in the left turn lane, for example.

The system (100) may then monitor the traveler's route, ensuring that the traveler maintains the planned route. If the traveler avers from the planned route, the app (110) may alert the traveler to the discrepancy. For example, the app (110) may cause the mobile communication device (101) to show a message indicating that the traveler should return to the planned route and provide instructions for doing so. Further, the app (110) may offer alternate routes for the traveler's consideration and possible selection. If the traveler selects a new route, the app (110) and/or system (100) may adjust accordingly. In any case, the system (100) and the traveler may be in constant or periodic communication, which communication may allow the system (100) to more efficiently incorporate the traveler into its priority system. This feedback from the system (100) to the traveler may assist the system (100) in managing traffic flow through the traffic grid.

In a situation wherein the system (100) does not have prior knowledge of the traveler's intended route, the system (100) may communicate with the traveler using the mobile communication device (101), in addition to predicting the traveler's intended direction or route. For example, when the traveler is detected within a detection zone (107) prior to arriving at an intersection (116), the app (110) may query, by using the display of the mobile communication device (101), if the traveler will be turning left, turning right, or traveling through when they reach the intersection (116). The traveler may then make a selection from the available options using the display (or other input device) of the mobile communication device (101). This communication from the system (100) to the traveler and back to the system (100) may provide information useful in considering where to place the traveler in the system's (100) priority system, as discussed in detail above. Again, this may be a form of feedback from the system (100) to the traveler, which feedback may assist the system (100) in managing traffic flow through the traffic grid. In an embodiment, the system (100) may assume a direction of travel and provide that to the user as the expected route with the traveler having to do nothing to confirm the route and only provide an indication if that predicted route is inaccurate. This can allow for the traveler to need to provide less feedback to the system (100) if the route predictions are correct. Further, changes made can be used in a machine learning or similar algorithm to improve the system's (100) ability to predict future routes of the same or other travelers.

In another embodiment, a vehicle may incorporate elements of the mobile communication device (101). For example, a traveler may be operating a smart bicycle or a smart scooter that is capable of acting (in whole or in part) as a mobile communication device (101) within the traffic control system (100). In some embodiments, a smart vehicle may work in combination with a mobile communication device (101) to perform the functions of the mobile communication device (101). In any case, the smart vehicle may communicate with the system (100) to provide efficient management of traffic in the traffic grid. For example, like in the embodiments discussed above, the smart vehicle may be capable of giving notifications to the traveler operating the vehicle. This may be a yet another form of feedback from the system (100) to the traveler, which feedback may assist the system (100) in managing traffic flow through the traffic grid. The system (100) may be able to indicate the status of an upcoming light at an intersection (116) through a screen, lights, an audible signal, vibrations/movement, and/or any other means understood by persons of ordinary skill in the art. Similarly, the traveler may be able to communicate with the system (100) through the smart vehicle, by, for example, indicating that the traveler would like to make a left turn at the upcoming intersection (116). Such an indication to the system (100) may be made by, for example, pushing a button or toggling a turning signal arm on the vehicle and communicating this action to the system (100).

In some embodiments, the system (100) may be able to exert some control over the smart vehicle. For example, the system (100) may be able to control the overall speed of members of a smart bicycle platoon that is passing though the traffic grid. By controlling the speed of the members of the platoon, the system (100) may more accurately determine estimated times of arrivals at various intersections (116). Accordingly, the system (100) in such a context may be able to very accurately predict when various lights at the intersections (116) need to be made green for the platoon to travel through without stopping. In such an embodiment, the system (100) may slow down or speed up the members of the platoon in order to keep the platoon on schedule. As another example, the system (100) may be able to stop all vehicles in an area to allow an emergency vehicle to pass uninterrupted.

In another embodiment, the system (100) may be able to exert even more control over vehicles that are specially equipped to be autonomous vehicles, which may a strong form of feedback from the system (100) to the traveler. Such autonomous vehicles may take any form, but will generally be motor-driven. In such a case, the system (100) may serve as a primary source of navigation for autonomous vehicles in the traffic grid. This way, the system (100) (along with its various components including priority detectors (103), intersection antennas (108), receivers (115), etc.) may serve as a facilitator for managing communications to and from the various autonomous vehicles, including facilitating communications between different autonomous vehicles.

In such an embodiment, the system (100) will generally operate in a manner similar to those discussed above, except in this embodiment, the system (100) will have a greater control (and potentially complete control) over the motorized vehicles. As a result, the use of signal lights at intersections (116) may even be discontinued, as long as non-autonomous vehicles are not present. In such a situation, there would be no required delay for having intersection signal lights change. Instead, vehicles arriving at an intersection (116) may simply have their trajectory altered in real-time to avoid collisions by the system (100). Control by the system (100) at each intersection can even eliminate the need for autonomous vehicles to communicate with each other. As the system (100) can know the location and speed of all autonomous vehicles within the grid, the system (100) can control all the vehicles acting as a central and universal control system.

By exerting such control over the motorized vehicles in a traffic grid, the system (100) may increase the safety of other, non-motorized vehicles and pedestrians. For example, the system (100) may form a platoon of motorized vehicles, and further, may prevent the platoon of vehicles from interacting with pedestrians by routing the platoon differently than the pedestrians. Further, the system (100) may increase the effectiveness of platooning by routing as many motorized vehicles as is possible together in a platoon. This can also allow the system (100) to improve interactions between autonomous and non-autonomous vehicles. Specifically, since the system (100) can have complete control over the actions autonomous vehicles, the system (100) can have the autonomous vehicles quickly react to an unexpected action of a non-autonomous vehicle. For example, if a pedestrian that had indicated they were going to cross an intersection (116) in a first direction is detected as beginning to cross the street in a second direction, the system (100) could immediately slow traffic that was originally expected to be allowed unimpeded through the intersection. This can allow the autonomous traffic to be stopped and avoid a potential collision, or to allow the system (100) to query and/or warn the pedestrian about the system's (100) confusion with their apparent actions.

In some embodiments, the system (100) may designate one or more vehicles or travelers to serve as a "lead car", which lead car may serve as a communications proxy for the system (100). For example, in an autonomous vehicle embodiment of the system (100), the system (100) may designate a first motorized vehicle within the traffic grid to be a lead car. The now-designated lead car may then communicate with additional motorized vehicles in its vicinity and relay any information gathered back to the system (100). Further, the lead car may be instructed by the system (100) to form a platoon of motorized cars, wherein each motorized car of the platoon shares some criteria, such as those cars that are each travelling in the same general direction. In such a case, the lead car may instruct other motorized vehicles meeting the criteria to follow the lead car. This process may be more efficient than a process wherein all vehicles communicate directly with the system (100) by, for example, sharing processing and communication resources with the lead car or cars. Further, a lead car may be designated for other, non-autonomous embodiments of the system (100). In such a case, communications and processing resources again may be shared between the system (100) and the mobile communication device (101) and/or smart vehicles used by travelers.

It should be recognized that one concern is potential abuse of the priority system by travelers. Specifically, if the priority system is arranged so a bicyclist using the priority system is given priority over a motor vehicle detected by other means, a traveler may be tempted to run their app (110) in "bicycle mode" while riding as a passenger in a motor vehicle to attempt to gain priority. These concerns may be reduced or alleviated by how priority is selected. As contemplated above, one particularly valuable methodology for managing or assigning priority is for the priority (outside of particular vehicles such as emergency vehicles that definitively identify themselves to the priority system) to be arranged in a fashion that maximizes traveler (as opposed to vehicle) throughput through a given intersection (116). In this way, a particular type of traveler does not have priority, and instead, all travelers are weighted equally based on their speed and regardless of their mode of conveyance. This means that there is little benefit of attempting to cheat the app (110) while driving a detected motor vehicle as it provides little, if any, additional priority.

In a still further embodiment, attempts to abuse the system (100) may also be thwarted by evaluating criteria of the traveler approaching the intersection (116). For example, pedestrians generally have a limited expected speed that is below the expected speed of a bicyclist, which expected speed is, in turn, below the expected speed of a motor vehicle. These differences in expected speed may be used to classify detected travelers for the purpose of weighting their inferred mode of conveyance differently. Similarly, differences in vibration (e.g., engine vs. road vibration) or acceleration may be used to detect what type of conveyance the traveler is using.

The system (100) may also provide for travelers to utilize the same app (110), but have different priority based on their current activity. For example, a given traveler may be treated the same as any other. However, when a traveler boards a municipal vehicle (e.g., a snowplow), the interaction of the app (110) on the traveler's mobile communication device (101) and the vehicle's identifier system may create a different value in the priority ladder for the combination. For example, in this situation, a snowplow and driver may have priority 2 (medium priority) while the driver is only a single standard traveler at priority 4 (low priority) in any other vehicle. Further, the snowplow with a different driver (one who does not operate it in snowy conditions) may also have priority 4. This ability to detect that an individual's mobile communication device (101) is within a particular vehicles (usually of a particular type) may provide for yet an additional level of priority granularity by providing signal combinations of a particular pattern greater priority than the signals independently. As another example, a traveler riding on a bicycle identified with the police may have increased priority over the same individual riding on a motorcycle not so associated.

Similarly, vehicles may be able to identify the number of passengers utilizing interactions. For example, a bus may be able to detect the number of signals from the travelers on board and then collect and coalesce those signals into a single "super" signal that acts to identify the bus as both a single vehicle, and as a transport for a large number of signals. In this way, full buses may be given increased priority to allow them to go express and reach more distant destinations quicker while still not disrupting pickups at later stops.

Similarly, a delivery truck may also be provided with different forms of priority. It may be the case that a city wants to have delivery trucks on the street at only specific times to provide for improved traffic flow (for example, early in the morning). During this time, the truck may be given a very high priority to allow it to get around the traffic grid quickly, while once this window is passed, the truck's priority may lower to being the same as any other vehicle. A similar situation may be used for garbage collection vehicles or other vehicles that commonly utilize roads when the roads are less congested. These vehicles could be provided with a very high priority to assist in them getting jobs done and the vehicles off the road during these hours where less congestion already exists.

In a yet further embodiment, the system may also be designed to improve the efficiency of vehicle pickups or of autonomous vehicles not carrying any individuals. In such cases, the number of travelers detected at any intersection may actually be smaller than the number of travelers effected by the speed of the vehicle in reaching its destination. A taxi-cab driving to pick up a fare, for example, is more efficient if it is on time. Thus, the system (100) may increase the priority assigned to a taxi-cab that has indicated it is driving to pick up a passenger. When the passenger enters, this "bonus" traveler is eliminated in favor of the number of travelers actually in the vehicle. Similarly, a bus may be given priority based on the number of potential riders detected at bus stops the bus will visit later in its route allowing a bus which is expected to be heavily utilized later in its route to better stay on schedule, even if it is currently empty.

A similar type of "bonus" traveler may be provided in other circumstances. For example, an autonomous vehicle not operated by a human traveler may be allowed to indicate that it comprises a single traveler, so long as the autonomous vehicle actually has no travelers present. In this way, an automated delivery truck, for example, would not be stuck at an intersection as not being detected since it contains no travelers, but it is desirable to move it efficiently. This bonus may be eliminated if the vehicle actually includes a traveler (e.g., a passenger) as the presence of the traveler may allow the autonomous vehicle to be detected. These "bonus" travelers may also be given different priority to more standard human travelers. Thus, an autonomous delivery truck may have the lowest priority of any vehicle, as the autonomous delivery truck cannot become impatient and violate a light, for example, but may still be allowed to go at some time to keep the autonomous delivery truck from being largely delayed.

This final concept is worth discussing, as it was also mentioned previously. While the above systems and methods are deigned to improve overall efficiency, it should be recognized that it may be necessary at some times to sacrifice maximized efficiency of the traffic grid in favor of making sure that there is some equality of waiting. For example, if a priority system always favors a large group over a single driver, an individual attempting to cross a very busy road may never be able to cross, as an individual traveler may always be less than the number of travelers in the detection zone (107) of the cross street. For at least this reason, the system (100) may have a maximum allowed wait time for any traveler. In such a case, the system (100) may allow that traveler to cross before the predetermined maximum time is reached, even if this action scarifies maximum efficiency. This maximum allowed wait time may prevent a frustrated traveler from disobeying a signal that the traveler cannot seem to change because of the system (100), which is one of the things the system is actually designed to prevent. Managing this process in this fashion may still provide a measure of equality to all travelers and their needs.

While the invention has been disclosed in connection with certain embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

It will further be understood that any of the ranges, values, properties, or characteristics given for any single component of the present disclosure may be used interchangeably with any ranges, values, properties, or characteristics given for any of the other components of the disclosure, where compatible, to form an embodiment having defined values for each of the components, as given herein throughout. Further, ranges provided for a genus or a category may also be applied to species within the genus or members of the category unless otherwise noted. Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "circular" are purely geometric constructs and no real-world component is a true "circular" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A system for assisting travelers through an intersection, the system comprising;

a receiver for receiving a location and direction of travel transmission from each mobile communication device in a plurality of mobile communication devices, each of said mobile communication devices in said plurality of mobile communication devices carried by a traveler in a plurality of travelers; and a control system, said control system:

evaluating said location and direction of travel information of each said mobile communication device in said plurality of mobile communication devices to determine if said mobile communication device is approaching an intersection;

for each of said mobile communication devices approaching said intersection, determining how said traveler carrying said mobile communication device will pass through said intersection based on information received from said mobile device; and adjusting signaling at said intersection to allow more of said travelers in said plurality of travelers to pass through said intersection without stopping than are stopped by said signaling at said intersection.

2. The system of claim 1, wherein said mobile communication device comprises a smartphone.

3. The system of claim 1, wherein at least one of said travelers in said plurality of travelers comprises a pedestrian.

4. The system of claim 1, wherein at least one of said travelers in said plurality of travelers comprises an individual in a motor vehicle.

5. The system of claim 4, wherein said motor vehicle includes multiple travelers in said plurality of travelers.

6. The system of claim 1, wherein at least one of said travelers in said plurality of travelers comprises an individual on a bicycle.

7. The system of claim 1, wherein at least one of said travelers in said plurality of travelers comprises an individual in an autonomous vehicle.

8. The system of claim 1, wherein said receiver requests information from said traveler carrying said mobile communication device.

9. The system of claim 1, wherein said receiver obtains a route from mapping software on said mobile communication device.

10. The system of claim 1, further comprising said control system sending an indication to said mobile communication device of said adjusted signaling at said intersection.

11. The system of claim 10, wherein said indication instructs said paired traveler to maintain speed approaching said intersection.

12. The system of claim 10, wherein said indication instructs said paired traveler to stop at said intersection.

13. The system of claim 1, further comprising sending an instruction to a vehicle carrying said traveler which instruction alters said vehicle's speed.

14. The system of claim 13, wherein said instruction stops said vehicle.

* * * * *